United States Patent
Saisho et al.

(10) Patent No.: US 7,688,491 B2
(45) Date of Patent: Mar. 30, 2010

(54) DIFFRACTIVE-OPTICAL ELEMENT, SCANNING OPTICAL SYSTEM, OPTICAL SCANNER, AND IMAGE FORMING APPARATUS

(75) Inventors: Kenichiro Saisho, Kanagawa (JP); Yoshinori Hayashi, Kanagawa (JP); Kohji Sakai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 23 days.

(21) Appl. No.: 11/850,401

(22) Filed: Sep. 5, 2007

(65) Prior Publication Data

US 2008/0068689 A1 Mar. 20, 2008

(30) Foreign Application Priority Data

Sep. 15, 2006 (JP) ............................. 2006-251482
Nov. 15, 2006 (JP) ............................. 2006-308606

(51) Int. Cl.
*G02B 26/08* (2006.01)
(52) U.S. Cl. .................................................. 359/205.1
(58) Field of Classification Search ............. 359/205.1, 359/206.1, 207.1, 207.2
See application file for complete search history.

(56) References Cited

U.S. PATENT DOCUMENTS

| 6,977,762 | B2 | 12/2005 | Hayashi |
|---|---|---|---|
| 7,068,407 | B2 | 6/2006 | Sakai et al. |
| 7,106,483 | B2 | 9/2006 | Hayashi et al. |
| 7,110,016 | B2 | 9/2006 | Suzuki et al. |
| 7,145,705 | B2 | 12/2006 | Hayashi |
| 7,154,651 | B2 | 12/2006 | Atsuumi et al. |
| 7,164,516 | B2 | 1/2007 | Hayashi et al. |
| 7,218,432 | B2 | 5/2007 | Ichii et al. |
| 2003/0202230 | A1* | 10/2003 | Kato .......................... 359/205 |
| 2004/0169905 | A1 | 9/2004 | Hayashi et al. |
| 2004/0196507 | A1 | 10/2004 | Sakai |
| 2005/0269496 | A1 | 12/2005 | Hayashi |
| 2006/0000990 | A1 | 1/2006 | Hayashi et al. |
| 2006/0077500 | A1 | 4/2006 | Hayashi et al. |
| 2006/0146422 | A1* | 7/2006 | Koike .......................... 359/742 |
| 2006/0187294 | A1 | 8/2006 | Saisho et al. |
| 2006/0232659 | A1 | 10/2006 | Hayashi et al. |
| 2006/0256185 | A1 | 11/2006 | Suzuki et al. |
| 2006/0284968 | A1 | 12/2006 | Hayashi et al. |
| 2007/0081217 | A1 | 4/2007 | Hayashi et al. |

FOREIGN PATENT DOCUMENTS

| JP | 2002-287062 | 10/2002 |
|---|---|---|
| JP | 2005-70124 | 3/2005 |
| JP | 2006-85487 | 3/2006 |

OTHER PUBLICATIONS

U.S. Appl. No. 12/174,899, filed Jul. 17, 2008, Saisho, et al.
U.S. Appl. No. 12/189,430, filed Aug. 11, 2008, Saisho.
U.S. Appl. No. 12/110,862, filed Apr. 28, 2008, Ichii, et al.

* cited by examiner

*Primary Examiner*—Euncha P Cherry
(74) *Attorney, Agent, or Firm*—Oblon, Spivak, McClelland, Maier & Neustadt, L.L.P.

(57) ABSTRACT

A diffractive-optical element that is transparent includes a diffraction surface that is formed by a step. A width of the step is set substantially equal to a common multiple of $\lambda_i/\{n(\lambda_i)-1\}$ for two or more wavelengths, where $\lambda_i$ (i=1, 2, . . . ) is a wavelength and $n(\lambda_i)$ is a refractive index with respect to the wavelength $\lambda_i$.

17 Claims, 9 Drawing Sheets

FIG. 5
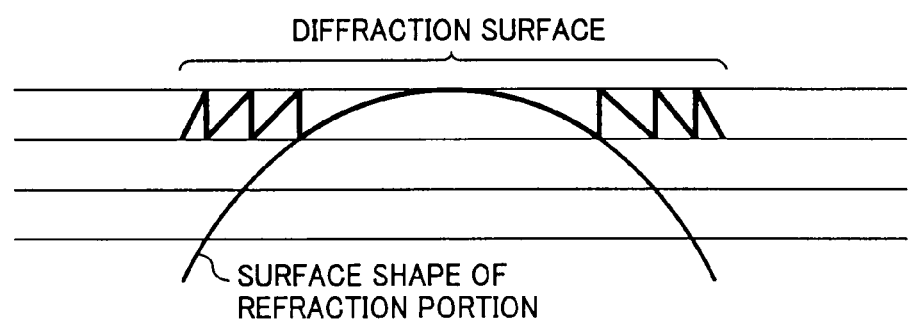
FIG. 6     FIG. 7     FIG. 8
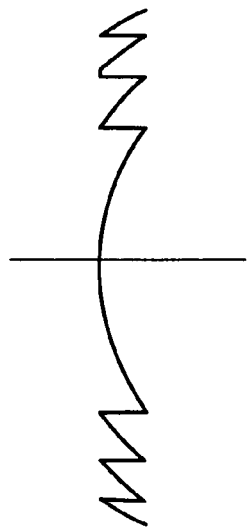 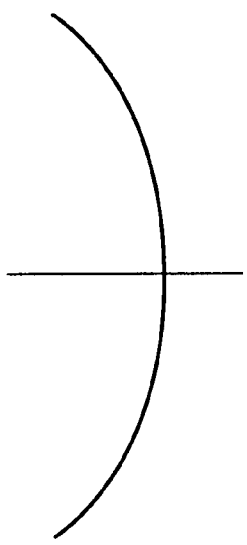 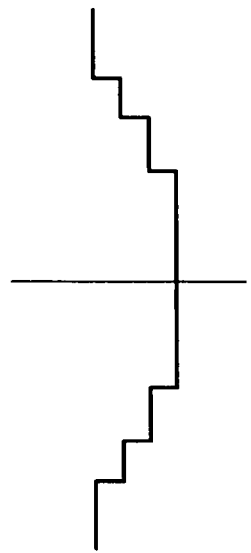

DIFFRACTIVE-OPTICAL ELEMENT, SCANNING OPTICAL SYSTEM, OPTICAL SCANNER, AND IMAGE FORMING APPARATUS

CROSS-REFERENCE TO RELATED APPLICATIONS

The present application claims priority to and incorporates by reference the entire contents of Japanese priority document, 2006-251482 filed in Japan on Sep. 15, 2006, and Japanese priority document, 2006-308606 filed in Japan on Nov. 15, 2006.

BACKGROUND OF THE INVENTION

1. Field of the Invention

The present invention relates to a diffractive-optical element, a scanning optical system, an optical scanning device, and an image forming apparatus.

2. Description of the Related Art

An optical scanning device guides beams emitted from a light source to an optical deflector by a first optical system, deflects the beams by the optical deflector, forms the deflected beams on a surface to be scanned as an optical spot by a second optical system, and optically scans the surface. Such an optical scanning device is widely known in relation to image forming apparatuses such as digital copiers, facsimile machines, optical printers, and optical plotters.

A semiconductor laser and a light-emitting diode (LED) used generally as light sources for such an image forming apparatus are monochromatic light sources. However, their light-emitting wavelengths differ by the type of the semiconductor laser and the LED. A photosensitive body optically scanned by the optical scanning device has different spectral characteristics of light sensitivity according to its type. In general, a light source that has a light-emitting wavelength that is suitable to photosensitive characteristics of the photosensitive body is selected.

In the optical scanning device, a scanning optical system that focuses the light emitted from the light source on the photosensitive body as an optical spot includes a lens that is a refractive optical system. The refractive index of a lens material differs by its wavelength because the material has a unique dispersion. Therefore, in related art, such a scanning optical system is designed based on the light-emitting wavelength of the light source to be used. An optical element used for the scanning optical system has no compatibility with light source wavelengths.

It is known in Japanese Patent Application Laid-Open No. 2006-085487 that a fluctuation caused by temperature change at a point of focus of a scanning optical system can be reduced by combining with another lens, using a diffractive-optical element. The diffractive-optical element has diffractive functions as an optical element used for the scanning optical system. However, this system does not improve the compatibility of the diffractive-optical element with light source wavelengths.

The optical scanning device has been widely known in relation to image forming apparatuses such as optical printers, digital copiers, and optical plotters. In recent years, such an optical scanning device that not only achieves a reduction in costs, but also is robust against environmental fluctuations and able to form a high-resolution image has been demanded.

To effectively reduce the costs of the optical scanning device, various types of lenses used for the optical scanning device are formed with a resin material. The resin material is light in weight and can be formed at a low cost. Special surface shapes, an aspheric surface in particular, can be formed easily. Adopting a special surface to the resin lens can improve optical characteristics, and reduce the number of lenses included in the optical system.

On the other hand, as known widely, the shape and the refractive index of the resin lens change due to environmental fluctuations, particularly, changes in temperature. Therefore, the optical characteristics, particularly power, change from a design value. This leads to a problem that a beam spot diameter that is the diameter of the optical spot on a surface to be scanned fluctuates due to the environmental fluctuations.

The power fluctuations of the resin lens due to temperature changes occur to a positive lens and a negative lens reversely with each other. A method of canceling out the fluctuation of the optical characteristics caused by environmental fluctuations that occurs at the positive and the negative resin lenses in the optical system of the optical scanning device, including the positive and the negative lenses, are well known.

The semiconductor laser commonly used as the light source of the optical scanning device has a nature that the emitting light wavelength shifts towards a long-wavelength side with temperature rise (the wavelength fluctuation caused by temperature change). The wavelength fluctuation in the light source imposes characteristic fluctuations caused by color aberration of the optical system used for the optical scanning device. Accordingly, this characteristic fluctuation also causes the fluctuation of the beam spot diameter.

The optical scanning device disclosed in Japanese Patent Application Laid-Open No. 2002-287062 that stabilizes the optical characteristics by adopting a diffraction surface is known. The fluctuation of the optical characteristics of the optical element caused by temperature change and the wavelength fluctuation in the light source are considered in the Japanese Patent Application Laid-Open No. 2002-287062.

Using the diffraction surface is effective for stabilizing the optical characteristics of the optical scanning device. Forming the diffraction surface generally requires a micro-fabrication technique with extremely high precision. For example, a diffraction surface that has a power equivalent to a spherical lens may be formed by grooves of concentric circles. However, intervals of the grooves rapidly narrow with an increase of a radius of the concentric circles. Accordingly, it is not necessarily easy to form high precision grooves, and this has become a barrier for forming the diffraction surface at a low cost.

SUMMARY OF THE INVENTION

It is an object of the present invention to at least partially solve the problems in the conventional technology.

A diffractive-optical element according to one aspect of the present invention, which is transparent, includes a diffraction surface that is formed by a step. A width of the step is set substantially equal to a common multiple of $\lambda_i/\{n(\lambda_i)-1\}$ for two or more wavelengths, where $\lambda_i$ (i=1, 2, ...) is a wavelength and $n(\lambda_i)$ is a refractive index with respect to the wavelength $\lambda_i$.

An optical scanning device according to another aspect of the present invention includes a light source that emits a light beam; an optical deflector that deflects the light beam from the light source; a first optical system that guides the light beam from the light source to the optical deflector; a second optical system that forms the light beam deflected by the optical deflector as an optical spot on a scanning surface; and an optical scanning unit that optically scans the scanning surface. At least one of the first optical system and the second optical system includes a diffractive-optical element that is transparent. The diffractive-optical element includes a diffraction surface that is formed by a step. A width of the step is set substantially equal to a common multiple of $\lambda_i/\{n(\lambda_i)-1\}$ for two or more wavelengths, where $\lambda_i$ (i=1, 2, . . . ) is a wavelength and $n(\lambda_i)$ is a refractive index with respect to the wavelength $\lambda_i$. The diffraction surface is formed in a surface shape set in a manner that a power of the diffraction surface and a power of a refraction surface are canceled out each other.

An image forming apparatus according to still another aspect of the present invention includes an image forming unit that forms an image by an optical scanning; and an optical scanning device including a light source that emits a light beam, an optical deflector that deflects the light beam from the light source, a first optical system that guides the light beam from the light source to the optical deflector, a second optical system that forms the light beam deflected by the optical deflector as an optical spot on a scanning surface, and an optical scanning unit that optically scans the scanning surface. At least one of the first optical system and the second optical system includes a diffractive-optical element that is transparent. The diffractive-optical element includes a diffraction surface that is formed by a step. A width of the step is set substantially equal to a common multiple of $\lambda_i/\{n(\lambda_i)-1\}$ for two or more wavelengths, where $\lambda_i$ (i=1, 2, . . . ) is a wavelength and $n(\lambda_i)$ is a refractive index with respect to the wavelength $\lambda_i$. The diffraction surface is formed in a surface shape set in a manner that a power of the diffraction surface and a power of a refraction surface are canceled out each other.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic diagram for explaining an example of a shape of the diffraction surface;

FIGS. 6 to 8 are schematic diagrams for explaining a diffraction portion and a refracting unit included in a Fresnel lens;

DETAILED DESCRIPTION OF THE PREFERRED EMBODIMENTS

Embodiments of the present invention will be described in detail below with reference to the accompanying drawings.

Figure 1:
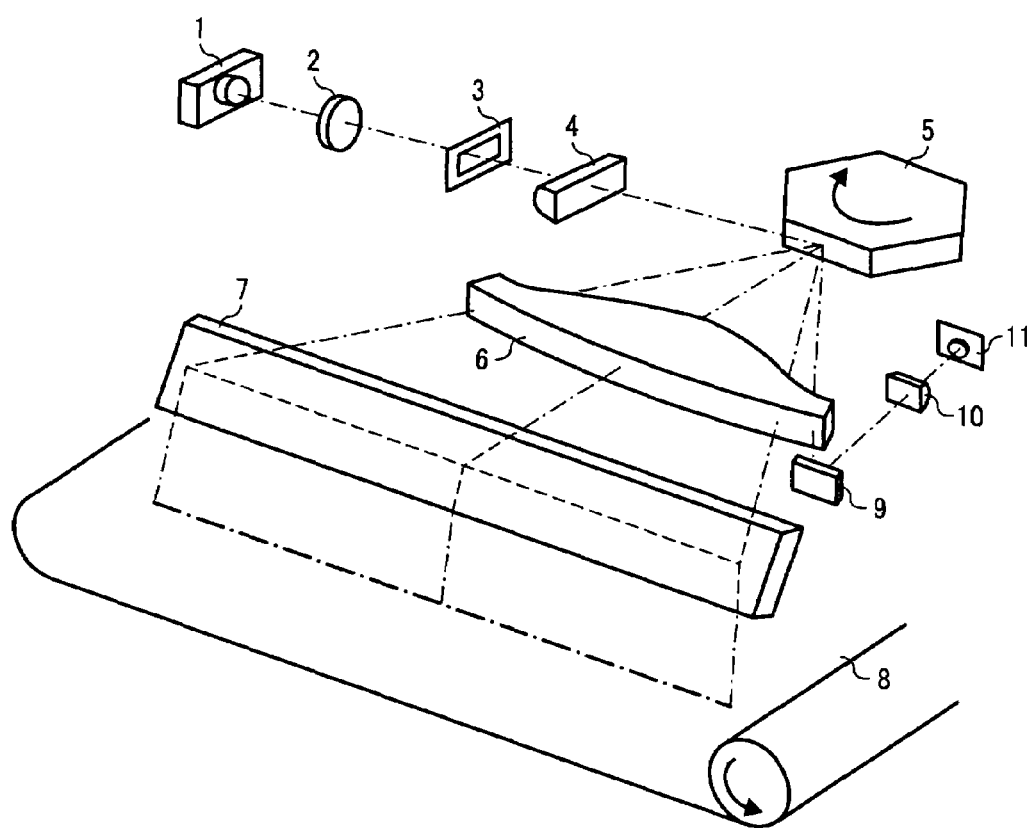
FIG. 1 is a perspective view for explaining an optical scanning device according to an embodiment of the present invention.

FIG. 1 is a perspective view for explaining an embodiment of an optical scanning device.

A light source 1 is a surface-emitting semiconductor laser. Beams emitted from the light source 1 are coupled to an optical system of a downstream stage by a coupling lens 2. The beams transmitted through the coupling lens 2 are incident on a line image forming lens 4 that is a line image forming optical system with a periphery of the beams being shielded and shaped while passing through an opening of an aperture 3. The line image forming lens 4 is a cylindrical lens having a positive power in a sub-scanning direction, and aligning a powerless direction towards a main scanning direction. The line image forming lens 4 focuses the incident beams in the sub-scanning direction. The line image forming lens 4 also collects the beams as a line image elongated in the main scanning direction near a deflection reflective surface of a polygon mirror 5 that is an optical deflector.

In other words, the coupling lens 2 and the line image forming lens 4 form a first optical system.

The beams reflected by the deflection reflective surface are transmitted through a scanning lens 6 that forms a second optical system, while being deflected at a constant angular velocity along with a constant velocity rotation of the polygon mirror 5. An optical passage of the beams is bent by a bending mirror 7 that guides the beams to a surface to be scanned. The beams are collected as an optical spot on a photoconductive photosensitive body 8, which is practically the surface to be scanned. The surface is thus optically scanned.

In the embodiment shown in FIG. 1, the second optical system is formed by one scanning lens 6. However, the second optical system may include a plurality of lenses.

The beams deflected by the polygon mirror 5 are reflected by a synchronizing mirror 9 prior to the optical scanning of the photosensitive body 8. The beams are collected to a synchronizing detecting unit 11 in the main scanning direction by a synchronization lens 10. A write start timing of the optical scanning is determined based on an output of the synchronizing detecting unit 11.

In this specification, a spot diameter of the optical spot is defined according to an intensity of $1/e^2$ in a line spread function of light intensity distribution of the optical spot on the surface to be scanned.

For the line spread function, when the light intensity distribution f(Y, Z) of the optical spot is defined by coordinates Y and Z in the main scanning direction and the sub-scanning direction, based on a central coordinate of the optical spot formed on the surface to be scanned, the line spread function LSZ in Z direction is defined by $$LSZ(Z)=\int f(Y, Z)dY$$

where the integration is performed over an entire width of the beam spot in Y direction.

The line spread function LSY in Y direction is defined by $$LSY(Y)=\int f(Y, Z)dZ$$

where the integration is performed over an entire width of the beam spot in Z direction.

These line spread functions LSZ(Z) and LSY(Y) generally represent a Gaussian distribution. The spot diameter in the Y direction and the Z direction is given by widths in the Y and the Z directions of an area where the line spread functions LSZ (Z) and LSY(Y) become equal to or more than the maximum value $1/e^2$.

The spot diameter defined by the line spread function as described above optically is used for slit scanning the optical spot at a constant speed. In this case, light passed through slits is received by an optical detector, and can be easily measured by integrating an amount of light received. A device performing such a measurement is offered commercially.

Figure 2:
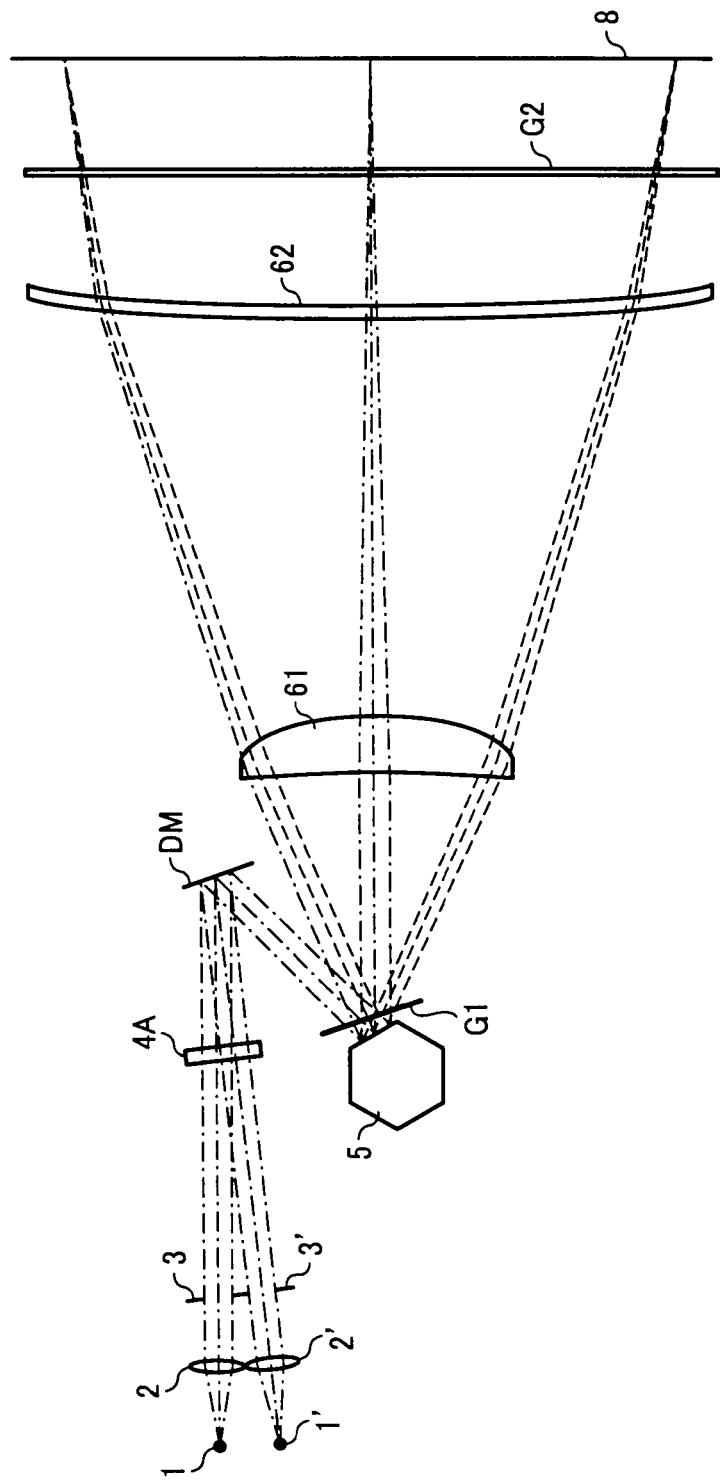
FIG. 2 is a schematic diagram for explaining an optical scanning device employing a multi-beam scanning system.

FIG. 2 is a schematic diagram for explaining another embodiment. To avoid complication, those with no possibility of confusion are denoted by the same reference numerals as FIG. 1.

The embodiment shown in FIG. 2 provides a two-dimensional optical arrangement of an optical scanning device performing a multi-beam scanning. The diagram shows light sources 1 and 1' that are surface-emitting semiconductor lasers, coupling lenses 2 and 2', apertures 3 and 3', a cylindrical lens 4A that is a line image forming optical system, a mirror DM, the polygon mirror 5, scanning lenses 61 and 62 forming the second optical system, and the surface 8 to be scanned (practically a photosensitive surface of a photosensitive body). Also shown are a soundproof glass G1 of a housing that seals the polygon mirror 5, and a dust-tight glass G2 of the housing of the optical scanning device. Although not shown in FIG. 1, the sound-proof glass G1 and the dust-tight glass G2 are also used in the embodiment shown in FIG. 1.

The beams emitted from the light sources 1 and 1' are coupled at the coupling lenses 2 and 2', respectively, and shaped by the apertures 3 and 3'. The beams are transmitted through the cylindrical lens 4A, reflected by the mirror DM, and formed as line images elongated in the main scanning direction near the deflection reflective surface of the polygon mirror 5. These line images are separated by a predetermined interval in the sub-scanning direction.

The two beams reflected by the polygon mirror 5 are deflected at a constant angular velocity along with a constant velocity rotation of the polygon mirror 5. The two beams are transmitted through the scanning lenses 61 and 62, and the dust-tight glass G2. The beams then form two optical spots separated in the sub-scanning direction on the surface 8 to be scanned, and optically scan the surface 8 with two lines, simultaneously.

Although not shown in FIG. 2, the write start timing of the optical scanning by each optical spot is determined by the same way as in the embodiment shown in FIG. 1.

In addition, for the first and the second optical systems, conventionally known various types may be used accordingly. For example, the easiest configuration of the first optical system is formed simply by a coupling lens. The coupling lens converts the beams from the light source to collimated beams, weak divergent beams, or weak convergent beams. Then the coupled beams may be guided to the optical deflector.

Instead, the first optical system may be formed by a coupling lens, and a line image forming optical system such as a cylindrical lens. The coupling lens converts the beams from the light source to collimated beams, weak divergent beams, or weak convergent beams. The cylindrical lens forms the coupled beams into a line image elongated in the main scanning direction, at a position of the deflection reflective surface of the optical deflector.

For the second optical system, a known fθ lens including equal to or more than one lens, an fθ mirror that is made by a reflecting surface having an fθ function, or other systems that can realize desired optical characteristics by having equal to or more than one lens and mirror may be used accordingly.

For the optical deflector, any known deflector such as a polygon mirror, a rotating double mirror, and a rotating single mirror may be used accordingly.

An embodiment of a diffractive-optical element will now be explained. There are various types of the diffractive-optical element. Here, a transmission-type (phase-type) diffractive-optical element such as a Fresnel lens, in which an orbicular zone separated by a step is narrowed gradually from an optical axis towards the peripheries, will be given as an example. An expression used for the following explanation is obtained from a scalar diffraction theory.

If the beams with a wavelength of λ are incident on the diffractive-optical element having a diffraction surface with step d and collecting light, the beams are phase-matched with a phase difference of m wavelengths and focused as diffractive light of the m-th order, if the shape of a diffraction surface satisfies Equation (1) for that natural number "m". The beams that are transmitted through each orbicular zone are separated by the step. The diffraction surface has a lens power by diffraction.

$$d = m\lambda/\{n(\lambda)-1\} \tag{1}$$

In Equation (1), "n(λ)" is a refractive index of an element material with respect to a wavelength λ.

A focal length f of such a focusing diffractive-optical element that focuses the diffractive light of the m-th order is provided as follows for the focal length $f_0$ with respect to the 0th order light.

$$f = [\{n(\lambda)-1\}d/\lambda m]f_0 \tag{2}$$

By Equation (1), because $[\{n(\lambda)-1\}d/\lambda m]$ in the right side of Equation (2) equals to 1, the focal length of the diffractive-optical element with respect to the diffractive light of the m-th order equals to the focal length f0 with respect to the 0th order light.

Two types of wavelengths λj and λk will be considered here. The step d of the diffractive-optical element is set so as to be used for phase matching with the wavelengths λj and λk. In other words, light of the wavelength λj is phase-matched with the phase difference of mj wavelength, and light of the wavelength λk is phase-matched with the phase difference of mk wavelength with respect to the step d.

To satisfy the condition, the Equation (3) should be satisfied.

$$d = m_j\lambda_j/\{n(\lambda_j)-1\} = m_k\lambda_k/\{n(\lambda_k)-1\} \tag{3}$$

The focal length of the diffractive-optical element at this time with respect to light of the wavelength λj is:

$$f_j = [\{n(\lambda_j)-1\}d/\lambda_j m_j]f_0 \tag{4-1}$$

With respect to light of the wavelength $\lambda_k$:

$$f_k = [\{n(\lambda_k)-1\}d/\lambda_k m_k]f_0 \tag{4-2}$$

In other words, when the step d of the diffraction surface satisfies Equation (3), the focal length of the diffractive-optical element becomes the same as the two types of wavelengths of $\lambda_j$ and $\lambda_k$. This enables to serve the same optical function towards the two wavelengths.

The condition that satisfies Equation (3) results that the step d is a common multiple of $$\lambda_j/\{n(\lambda_j)-1\} \text{ and } \lambda_k/\{n(\lambda_k)-1\}$$

with respect to the wavelengths $\lambda_j$ and $\lambda_k$.

In other words, when the two types of optical scanning devices with different light-emitting wavelengths $\lambda_j$ and $\lambda_k$ from light source are considered, the diffractive-optical element that satisfies Equation (3) may be used for the first and the second optical systems of the optical scanning device. Accordingly, the diffractive-optical element may be used as the optical element that has the same optical functions with respect to the respective two types of optical scanning devices. The optical scanning devices have either light source having different emitting wavelength. In other words, the diffractive-optical element has a compatibility with the two types of optical scanning devices.

The above explanation may be generalized. The beams emitted from the light source are guided to the optical deflector by the first optical system and deflected by the optical deflector. The deflected beams are formed on the surface to be scanned by the second optical system as the optical spot. The optically transmitting diffractive-optical element used for any one of the first and the second optical system or both in the optical scanning device that optically scans the surface to be scanned is formed with the diffraction surface with the step. When the step d is set equal to the common multiple of $$\lambda_i/\{n(\lambda_i)-1\}$$

with respect to the wavelengths $\lambda_i$ (i=1, 2, ... ) equal to or more than two and the refractive index of $n(\lambda_i)$ of the element material with respect to the wavelength $\lambda_i$, the diffractive-optical element becomes compatible with the light source equal to or more than two of the wavelength $\lambda_i$ (i=1, 2, ... ).

When the step d is set equal to the common multiple of $$\lambda_i/\{n(\lambda_i)-1\}$$

with respect to the wavelengths $\lambda_i$ (i=1, 2, ... ) equal to or more than two, and the refractive index of $n(\lambda_i)$ of the element material to the wavelengths $\lambda_i$, it is technically not easy to match the step d exactly to the common multiple. However, because the diffractive-optical element may just have the same optical function with respect to the wavelengths, the step and the common multiple may correspond within a range that can realize the optical function the same with respect to the wavelengths. The step d is set equal to the common multiple of in the present embodiment means as such.

The characteristic related to the focusing of the diffractive light is that the focal length is inversely proportional to the wavelength. In other words, the power is proportional to the wavelength. In a light-emitting wavelength region of a semiconductor laser and an LED used as the light source for the optical scanning device, the power fluctuation due to the wavelength fluctuation of the diffractive-optical element is overwhelmingly larger than the power fluctuation due to the dispersion of the refractive index of the material.

In other words, even when Equation (3) does not exactly satisfy due to the dispersion of the refractive index of the material, the power difference is extremely small compared with the power difference caused by the original wavelength difference. Therefore, the diffractive-optical element of the present invention may be used as the optical element that has a compatibility with the light source of the different light-emitting wavelength. Accordingly, the diffractive-optical element of the present embodiment may minimize a drop of diffraction efficiency for an amount of light with the same reason.

As such, the diffractive-optical element of the present embodiment has a compatibility with different types of optical scanning devices using the light source of different light-emitting wavelengths. As a result, it can reduce a number of components and achieve a low cost for implementing the different types of optical scanning devices.

As for the shape of the diffraction surface, the shape of the diffraction surface is preferably set so as the power at the diffraction portion and the power at the refracting unit are canceled out each other.

Taking the Fresnel lens, for example, the diffraction portion of the diffraction surface, as shown in FIG. 5, has a shape that the surface of the refracting unit is bent with an appropriate step and pitch. To acquire the same power as the refracting unit, the shape and the power at the diffraction surface are the one that the diffraction portion and the refracting unit are combined. Generally, the pitch of the steps of the diffraction portion, as shown in an example shown in FIG. 6, narrows gradually towards the periphery of the lens. Therefore, when the diffraction portion is formed by molding, the forming of the diffraction portion tends to become difficult.

In such a case, the optical element of the present embodiment is set so as the power at the diffraction portion (positive power) (FIG. 6) and the power at the refracting unit (negative power) (FIG. 7) are canceled out each other. Accordingly, a bent portion of the diffraction portion becomes a blunt angle as the shape of the diffraction surface in FIG. 8. As a result, the molding becomes easy.

In the example shown in FIG. 8, the shape of the diffraction surface is a multi-step type. An angle of the bent portion is a right angle and forms a stair-like shape symmetric to the optical axis. The multi-step diffraction surface such as this is further easy to mold. Optically, the diffractive light of the 0th order light and the diffractive light of an order equal to or more than one are the same and equivalent to a non-power surface. As a result, an optical performance is less prone to deteriorate with respect to an eccentricity.

The power at the diffraction portion of the diffraction surface may be set individually with respect to the main and the sub-scanning directions. When the diffraction portion such as this is set on the same surface, the bent portion of the diffraction portion becomes a concentric ellipse or a concentric circle, when the diffraction surface is seen from the optical axis direction. The diffraction portion sets the power individually with respect to the main and the sub-scanning directions. However, when the diffraction surface with the concentric ellipse and the concentric circle are formed by a mold, there is a trouble of taking the axis out and a bite clearance needs to be considered.

In such a case, as the optical element of the present embodiment, one diffraction surface may be formed into a "shape that the power at the diffraction portion only acts on a certain direction (main scanning direction or sub-scanning direction) ". That is, one diffraction surface is formed to have a straight step shape in parallel with any one of the main scanning direction and the sub-scanning direction or both. As a result, the forming of the molding becomes easy.

The shape of the diffraction surface is realized by cutting the mold. When the shape of the steps is made in a straight line, cutting can be performed by moving a cutting bite only in one direction. There is no problem to clear the bite.

Also, as in the optical element of the present embodiment, if it has the stair-like shape symmetrical to the optical axis, an angle to place the bite becomes a right angle. As a result, the forming of the mold becomes further easier.

When the steps of the diffraction surface of the diffractive-optical element become too large, a vignette in geometrical optics may generate at the step, and a large spherical aberration may generate when the entered beams are not collimated.

To avoid such problems, it is preferable to limit a size of the steps to a minimum. To be more precise, as the optical element of the present embodiment, it is preferable to set the step d of the diffraction surface substantially equal to a least common multiple of $$\lambda_i/\{n(\lambda_i)-1\}$$

with respect to the wavelength $\lambda_i$ (i=1, 2, ... ) equal to or more than two, and the refractive index of $n(\lambda_i)$ of the element material with respect to these wavelengths $\lambda_i$.

When the step of the diffraction surface becomes large, the maximum pitch also becomes large. However, if the maximum pitch exceeds a width of the beams entering the diffraction surface, the diffractive-optical element for the beams becomes the same as a mere refraction surface. Accordingly, an effect unique to the diffraction cannot be exercised. Therefore, as the optical element of the present embodiment, a size relationship with an incident beam diameter and the "maximum pitch of the diffraction surface" is to be adjusted, so as "the maximum pitch at the diffraction surface becomes smaller than the incident beam diameter entering the diffraction surface".

As in a scanning optical system of the present embodiment, the lens always has dispersion characteristics, when it has the diffractive-optical element compatible with the wavelengths having different light-emitting wavelengths. Or, the lens has the dispersion characteristics when it is communized to the wavelengths equal to or more than two as the scanning optical system. Accordingly, a focus position in geometrical optics inevitably changes when the wavelength changes. To avoid the problem, the one that can adjust a set position may be included in the optical element in the scanning optical system. Accordingly, a fluctuation of the focus position in geometrical optics that occurs with an exchange of the light source having different wavelength can be dealt with.

In addition, with an image forming apparatus forming an image by the optical scanning, various types of things can be used for the photosensitive body that is an optical scanning target optically scanned by the optical scanning device. For example, a silver salt film may be used for the photosensitive body. In this case, a latent image formed by optical scanning writing can be visualized by silver salt photographic process. Such image forming apparatus may be used as an optical plate making apparatus and an optical drawing apparatus that draws a CT scan image and the like.

As the photosensitive body, a coloring medium (positive printing paper) that develops color by heat energy of a beam spot during optical scanning may also be used. In this case, a visualized image may be formed directly by the optical scanning. As the photosensitive body, a "photoconductive photosensitive body" may also be used. As the photoconductive photosensitive body, a sheet-like type such as a zinc-oxide paper may be used. Or a drum-like type or a belt-like type that can be used repeatedly, such as a selenium photosensitive body and an organic optical semiconductor may be used.

When the photoconductive photosensitive body is used, the photosensitive body is charged uniformly, and an electrostatic latent image is formed by optical scanning by the optical scanning device. The electrostatic latent image is visualized by development as a toner image. The toner image is directly fixed on the photosensitive body when the photosensitive body is the sheet-like type such as the zinc oxide paper. When the photosensitive body is the type that can be used repeatedly, the toner image is transferred and fixed onto a sheet-like recording medium such as a transferring paper and an OHP transparency sheet (plastic sheet for an overhead projector).

A transferring of the toner image from the photoconductive photosensitive body to the sheet-like recording medium may be transferred directly from the photosensitive body to the sheet-like recording medium (direct transfer method). Or, it may be once transferred onto an intermediate transfer medium such as an intermediate transfer belt, and then transferred from the intermediate transfer medium to the sheet-like recording medium (intermediate transfer method). Such an image forming apparatus may be used as an optical printer, an optical plotter, a digital copier, and the like.

The image forming apparatus arranges a plurality of the photoconductive photosensitive bodies along a conveying passage of the sheet-like recording medium. Then, the electrostatic latent image is formed to the respective photosensitive bodies using a plurality of the optical scanning devices. The toner images obtained by visualizing these are transferred and fixed onto the same sheet-like recording medium, thereby obtaining a synthetic color image and multi-color image. Accordingly, a tandem type image forming apparatus can be performed.

An embodiment of the image forming apparatus will now be explained with reference to FIG. 9. This image forming apparatus is a "laser printer".

A laser printer 100 includes a "photoconductive photosensitive body formed in cylinder" as a photosensitive image carrier (optical scanning target) 111. A charging roller 112 as a charging unit, a developing device 113, a transferring roller 114, and a cleaning device 115 are arranged around the image carrier 111. A "corona charger" may also be used as the charging unit.

An optical scanning device 117 that performs optical scanning by laser beams LB is provided to the laser printer 100. An exposure by the optical writing is performed between the charging roller 112 and the developing device 113.

Figure 9:
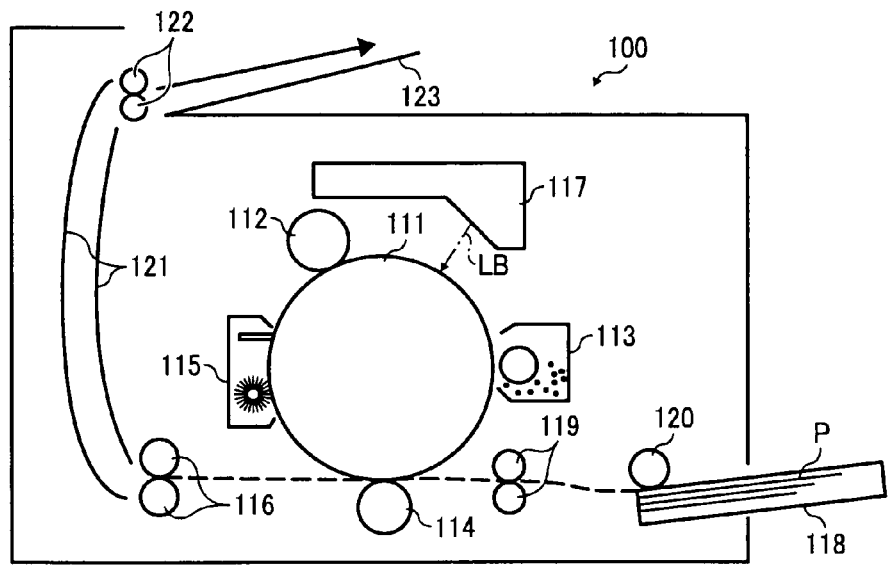
FIG. 9 is a schematic diagram for explaining an image forming apparatus according to another embodiment of the present invention.

FIG. 9 shows a fixing device 116, a reference numeral 118 denotes a cassette, a pair of resist rollers 119, and a paper feeding roller 120. Also shown are a conveying passage 121, a pair of paper ejecting rollers 122, a tray 123, and transfer paper P used as a sheet-like recording medium.

When an image is formed, the image carrier 111 that is the photoconductive photosensitive body rotates in constant velocity in a clockwise direction. A surface of the image carrier 111 is uniformly charged by the charging roller 112. An electrostatic latent image is formed by an exposure due to the optical writing by the laser beams LB of the optical scanning device 117. The formed electrostatic latent image is a so-called negative latent image, and the imaging unit is exposed.

The electrostatic latent image is reversal-developed by the developing device 113, and the toner image is formed on the image carrier 111. The cassette 118 storing the transfer paper P is detachable to the image forming apparatus 100 main body. In a state that the cassette 118 is mounted as shown in FIG. 9, a top sheet of the stored transfer paper P is fed by the paper feeding roller 120. An end of the fed transfer paper P is held by the pair of resist rollers 119. The pair of resist rollers 119 feed the transfer paper P to a transferring unit at the same time that the toner image on the image carrier 111 is moved to a transferring position.

The fed transfer paper P is superimposed with the toner image at the transferring unit and the transfer image is electrostatically transferred by an action of the transferring roller 114. The transfer paper P on which the toner image is transferred is sent to the fixing device 116. The toner image is fixed at the fixing device 116. The transfer paper P that passes through the conveying passage 121 is discharged on to the tray 123 by the pair of paper ejecting rollers 122.

The surface of the image carrier 111 after the toner image is being transferred is cleaned by the cleaning device 115, and a residual toner, a paper powder, and the like are removed.

By using this optical scanning device as the optical scanning device 117, the image forming apparatus that is compatible with different types of light sources can be obtained.

Figure 10:
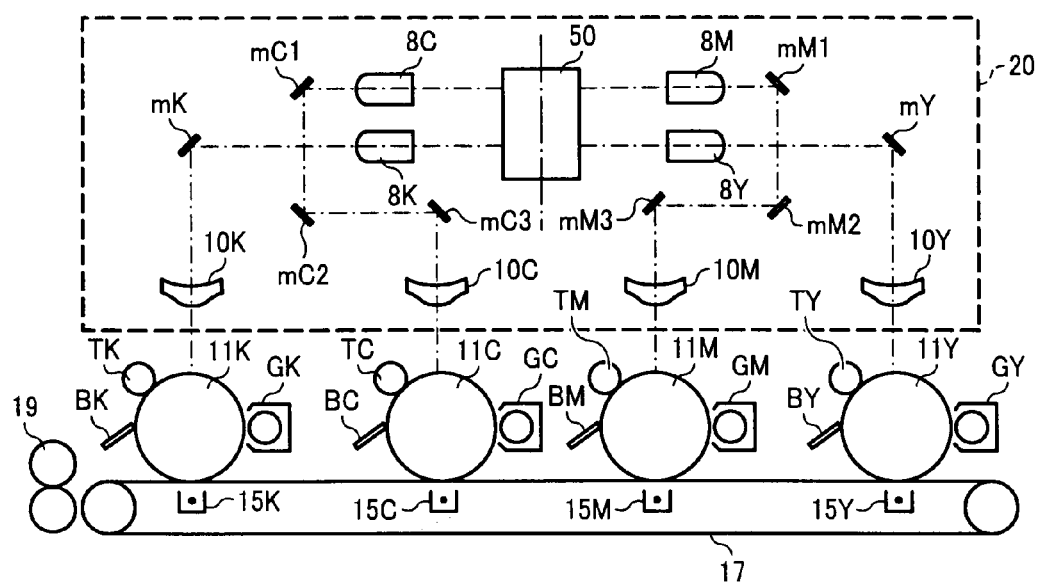
FIG. 10 is a schematic diagram for explaining an image forming apparatus according to still another embodiment of the present invention.

FIG. 10 is a schematic diagram showing only a main body of another embodiment of the image forming apparatus.

This image forming apparatus is a tandem type color image forming apparatus. In FIG. 10, a reference numeral Y denotes yellow, M denotes magenta, C denotes cyan, and K denotes black. Photosensitive bodies 11Y, 11M, 11C, and 11K, which are the optical scanning target, are rotatable in a clockwise direction. Chargers TY, TM, TC, and TK, developers GY, GM, GC, and GK, transferring units 15Y, 15M, 15C, and 15K, and cleaning units BY, BM, BC, and BK are arranged around each photosensitive body sequentially in a rotating direction.

An optical scanning device 20 optically scans a surface of the photosensitive bodies between the chargers TY, TM, TC, and TK, and the developers GY, GM, GC, and GK. Accordingly, the electrostatic latent image is formed on each photosensitive body. The electrostatic latent image on each photosensitive body is developed by the corresponding developer, thereby forming a toner image of each color Y, M, C, and K on the photosensitive bodies.

A transfer belt 17 rotates in an anti-clockwise direction, and conveys the sheet-like recording medium by sticking the sheet-like recording medium to an upper peripheral surface due to electrostatic adsorption. Then, a yellow toner image on the photosensitive body 11Y is transferred onto the sheet-like recording medium by the transferring unit 15Y. The toner image of each color on the photosensitive bodies 11M, 11C, and 11K is sequentially transferred on the sheet-like recording medium by the transferring units 15M, 15C, and 15K. Accordingly, the toner images of four colors are superimposed on the sheet-like recording medium, thereby forming a color image. The color image is fixed on the sheet-like recording medium by a fixing device 19.

In FIG. 10, an optical passage of an optical deflector 50 hereinafter described of the optical scanning device 20 is shown. Although not shown in FIG. 10, the optical scanning device 20 has four types of light sources for the photosensitive bodies 11Y through 11K. The beams from these light sources are guided to the optical deflector 50 by the first optical system, respectively. The first optical system corresponding to each light source is same as the one explained in FIG. 1 or 2, and includes the coupling lens, the cylindrical lens, the aperture, and the like.

The optical deflector 50 is a polygon mirror elongated in an axis direction, and deflects the beams guided from each light source by the first optical system, as shown in FIG. 10.

As an example, the beams that optically scan the photosensitive body 11 will be explained. The beams are intensity-modulated by image information of a magenta color component of the color image that is to form the image. When the beams are deflected by the optical deflector 50, the beams are transmitted through a scanning lens 8M, and the passage is bent by sequentially reflected by bending mirrors mM1, mM2, and mM3. The beams are guided on the photosensitive body 11m by transmitting through a scanning lens 10M. A optical spot is formed on the photosensitive body 11M by an action of the scanning lenses 8M and 10M that form the second optical system. The optical scanning of the other photosensitive bodies will be performed similarly.

By using this optical scanning device as the optical scanning device 20, the image forming apparatus that is compatible with the different types of light sources can be obtained.

A specific example of the optical scanning device, which is explained above with reference to FIG. 1, will be explained.

As explained earlier, although not shown in FIG. 1, the optical scanning device shown in FIG. 1 includes the sound-proof glass of the housing that seals the polygon mirror 5, and the dust-tight glass of the housing of the optical scanning device. The sound-proof glass and the dust-tight glass both have thickness of 1.9 millimeters. The sound-proof glass is inclined 10 degrees with respect to a direction in parallel with the main scanning direction within a plane perpendicular to a rotation axis of the polygon mirror 5.

The scanning optical system of the optical scanning device in the embodiment that has been explained is commonly used for two types of light sources with light-emitting wavelengths of 655 nanometers and 785 nanometers. The light-emitting wavelengths are at 25 degrees centigrade.

A refractive index with respect to the wavelengths of glass of the 655 nanometers and 785 nanometers, and its temperature fluctuations and a linear expansion coefficient are shown below. The glass is a material for the sound-proof glass and the dust-tight glass.

|  | Glass Median value | Temperature fluctuation | Linear expansion coefficient |
| --- | --- | --- | --- |
| Wavelength 655 nm | 1.514350 | 1.514290 | 7.5 × 10−6 |
| Wavelength 785 nm | 1.511076 | 1.511027 | 7.5 × 10−6 |

The median value is a refractive index at a standard temperature of 25 degrees centigrade. The temperature fluctuation is a refractive index with respect to each wavelength when the temperature rises 20 degrees from the standard temperature.

The two types of light sources are called the light source 1 and a light source 2. The light-emitting wavelength at 25 degrees centigrade, and an amount of temperature transition (temperature change: an amount of wavelength change per 1 degree centigrade) with respect to the light sources 1 and 2 are shown in Table 1.

TABLE 1

|  | Light emitting wavelength (25° C.) | Amount of temperature transition |
| --- | --- | --- |
| Light source 1 | 785 nm | +0.23 nm/° C. |
| Light source 2 | 655 nm | +0.17 nm/° C. |

The coupling lens 2, the cylindrical lens 4, and the scanning lens 6 that form the first optical system are formed by the same resin material, respectively. The resin material is simply called "resin", hereinafter.

The refractive index of the resin with respect to the two types of light-emitting wavelengths is shown in Table 2.

TABLE 2

| Resin | Median value | Temperature fluctuation |
|---|---|---|
| Wavelength 655 nanometers (25° C.) | 1.527235 | 1.525367 |
| Wavelength 785 nanometers (25° C.) | 1.523859 | 1.522026 |

The linear expansion coefficient of the resin is $7.0 \times 10^{-5}$.

In Table 2, the wavelength and the median value are the refractive indexes at the standard temperature of 25 degrees centigrade. The temperature fluctuation is the refractive index with respect to each wavelength when the temperature rises 20 degrees from the standard temperature.

The coupling lens 2, the cylindrical lens 4, and the aperture 3 that is arranged between the coupling lens 2 and the cylindrical lens 4 that form the first optical system will be explained.

The coupling lens 2 is formed by the resin. Its focal length is approximately 5 millimeters and arranged so as to have a function to convert the divergent beams from the light source to the weak divergent beams.

The coupling lens 2 uses the diffraction surface for an incident surface, and a projection surface is in aspheric surface. The aspheric surface is set so as to adequately correct a wavefront aberration of the coupled beams.

For the diffraction surface at an incident side of the coupling lens 2, a phase function $\phi(R)$ is expressed by $$\phi(R) = C \cdot R^2$$

using C as a coefficient.

The coefficient C with respect to the light of the light-emitting wavelengths of the light sources 1 and 2 are shown in Table 3.

TABLE 3

| | C |
|---|---|
| Light source 1 (785 nm) | −0.027003 |
| Light source 2 (655 nm) | −0.027177 |

When the wavelength is different, there is a difference in the refractive index caused by material dispersion. Accordingly, although the same shape, the phase function (therefore, coefficient C) is different depending on the wavelength.

The semiconductor laser 1 and the coupling lens 2 are fixedly held to a holding member with a material having the linear expanding coefficient of $1.7 \times 10^{-5}$.

The diffraction surface of the incident surface of the coupling lens 2 is formed as a stair-like diffraction surface of which the diffractive steps are the concentric circles on a paraboloidal surface of which a constant coefficient is 0.051546391. At this time, the power at the incident surface of the coupling lens 2 becomes P1 (power at the diffraction surface)=−P2 (power at the paraboloidal surface forming the refracting unit) at both in the main scanning and the sub-scanning directions. The finished diffraction surface becomes a stair-like shape, that is, a multi-step type. The power at the incident side surface of the coupling lens 2 is non-powered both in the main scanning and the sub-scanning directions.

The step d at the diffraction surface is 7496.38 nanometers.

The refractive index of $n(\lambda)$ of the resin that is a material for the coupling lens 2 is 1.523859 with respect to a wavelength of 785 nanometers and 1.527235 with respect to a wavelength of 655 nanometers. Therefore, $$\lambda/\{n(\lambda)-1\}$$

is 1.499 micrometers with respect to a wavelength of 785 nanometers, and 1.249 micrometers with respect to a wavelength of 655 nanometers.

At this time, the equations are $1.499 \times 5 = 7.495$ μm and $1.249 \times 6 = 7.494$ μm.

Therefore, the step $d = 7496.38$ nm ≈ 7.496 μm is substantially equal to the least common multiple of $\lambda/\{n(\lambda)-1\}$ with respect to the wavelengths of 785 nanometers and 655 nanometers.

In other words, the diffraction surface of the embodiment is the shape optimized for a fifth diffractive light to the light of a wavelength of 785 nanometers and a sixth diffractive light to the light of a wavelength of 655 nanometers.

Figure 3:
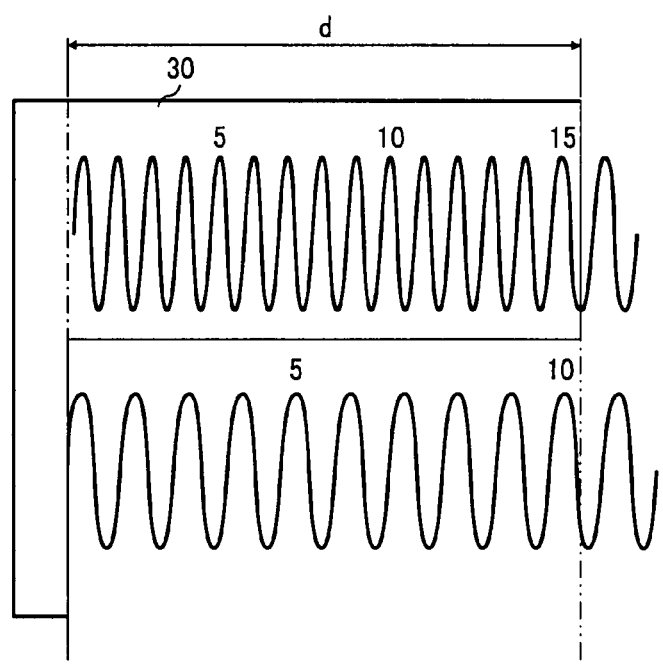
FIGS. 3 and 4 are schematic diagrams for explaining phase matching of a diffraction surface.
Figure 4:
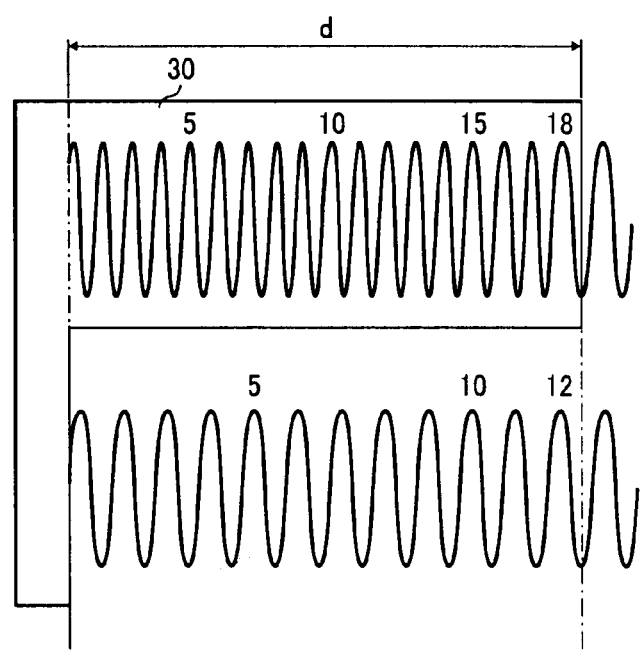

FIGS. 3 and 4 are schematic diagrams showing a state of the phase matching at the step of the diffraction surface. A portion 30 is a resin portion. Because the diffraction surface is formed to a surface of the incident side of the coupling lens, the light enters from a right hand side of FIGS. 3 and 4.

FIG. 3 is a state of the phase matching with respect to a wavelength of 785 nanometers. The phase matching occurs at the tenth wavelength that propagates air and at the fifteenth wavelength that propagates the resin portion, thereby generating the fifth diffractive light.

FIG. 4 is a state of the phase matching with respect to a wavelength of 655 nanometers. The phase matching occurs at the twelfth wavelength that propagates the air and the eighteenth wavelength that propagates the resin portion, thereby generating the sixth diffractive light.

If the step d is within a coherence length of the laser light emitted from the light sources 1 and 2, the diffractive-optical element using an arbitrary m-th order diffractive light may be designed. The coherence length indicates the theoretical limit of diffractive function in the diffractive-optical element. In general, a spectrum of the semiconductor laser is a full width at half maximum equal to or less than 1 nanometer. Because the coherence length is said to extend over a few millimeters to a few meters, the adequate diffractive light can be obtained if the step is about a few micrometers.

Accordingly, the diffraction surface with the step d may be used commonly for the light sources of a wavelength of 785 nanometers and a wavelength of 655 nanometers.

The difference between the focus position in geometrical optics of both diffractive lights (fifth diffractive light and sixth diffractive light) by the diffraction surface is only a minute difference influenced only by the material dispersion. To absorb the difference in geometrical optics, the coupling lens 2 is made positionally adjustable in the optical axis direction. A thickness of an adhesive layer that adhere the coupling lens 2 to a chassis is adjusted corresponding to the light-emitting wavelength of the light source.

As described above, the surface shape of the diffraction surface is set so as the power P1 of the diffraction portion and the power −P2 of the refracting unit are canceled out each other, and is the multi-step type.

In the embodiment, the power to correct the power at the whole optical system fluctuate by the temperature fluctuation, using negative dispersion characteristics of the diffraction surface is set to the diffraction surface.

The aperture 3 arranged between the cylindrical lens 4 and the coupling lens 2 determines a beam waist diameter (optical spot diameter). The aperture 3 is a "rectangular shape opening" of an opening diameter of 2.72 millimeters in the main scanning direction and the opening diameter of 2.28 millimeters in the sub-scanning direction. The aperture 3 shapes the beams coupled by the coupling lens 2. The aperture diameter is determined depending on a design of the optical system aiming a desired spot diameter on an image surface.

The cylindrical lens 4 is made of resin. The incident surface of the cylindrical lens 4 is a cylindrical surface having a curvature radius of 19.72 millimeters in the sub-scanning direction. The projection surface of the cylindrical lens 4 is a flat lens. The line image forming lens may also have the diffraction surface described as above. The design value of the cylindrical lens 4 is determined by a layout of the optical system.

The optical system from the optical deflector to the surface to be scanned will be explained.

The polygon mirror 5 that is the optical deflector is made of six reflecting surfaces having the radius of inscribed circle of 13 millimeters. An angle θ that is made by a proceeding direction of the beams entering from the light source side and the proceeding direction of the beams reflected towards a position of image height 0 at the surface 8 to be scanned by the deflection reflective surface is 68 degrees.

Data of the optical system on the optical passage from the optical deflector to the surface to be scanned will be shown below in Table 4.

TABLE 4

|  | Rm | Rs | Dx | Dy | N |
|---|---|---|---|---|---|
| Optical deflector (Rotating axis) | — | — | 43.0 | 6.7 | — |
| Scanning lens 6 incident surfaces | 179 | 96.399 | 13.5 | 0 | resin |
| Scanning lens 6 projection surfaces | −157.258 | −19.327 | 176 |  |  |
| Surface to be scanned | — | — | — | — | — |

In Table 4, Rm indicates a paraxial curvature in the main scanning direction, Rs indicates the paraxial curvature in the sub-scanning direction, and Dx and Dy indicate a relative distance from an origin of each optical element to an origin of next optical element. The unit is millimeter.

For example, as for the Dx and Dy with respect to the optical deflector, when seen from the rotational axis of the optical deflector (polygon mirror 5), the origin of the incident surface of the scanning lens 6 shifts 43.0 millimeters in the optical axis direction, and shifts 6.7 millimeters in the main scanning direction. As described above, the sound-proof glass is arranged between the optical deflector 5 and the scanning lens 6, and the dust-tight glass is arranged between the scanning lens 6 and the surface 8 to be scanned.

Each surface of the scanning lens 6 is aspheric. Each surface has a noncircular arc shape in the main scanning direction, and a special surface that the curvature within a sub-scanning section (virtual section in parallel with the optical axis and the sub-scanning direction) changes to the main scanning direction.

The noncircular arc is expressed by the following general expression. In the expression, the paraxial curvature radius Rm within a main scanning section (virtual section including the optical axis and in parallel with the main scanning direction), a distance Y from the optical axis in the main scanning direction, and a conical constant Km are used. High order coefficients A1, A2, A3, A4, and the like, and a depth X in the optical axis direction are also used:

$$X = (Y^2/Rm)/[1+\sqrt{1-(1+Km)(Y/Rm)^2}]$$
$$+A1Y+A2Y^2+A3Y^3+A4Y^4+A5Y^5+A6Y^{6+\cdots}$$

An expression that expresses a state of a curvature $C_s(Y)$ within the sub-scanning section (Y is a coordinate in the main scanning direction having the optical axis position as the origin) changing in the main scanning direction is represented by the following equation. Curvature radius $R_s(0)$ within the sub-scanning section including the optical axis and coefficients B1, B2, B3, and the like are used:

$$C_s(Y) = [1/R_s(0)] + B1Y + B2Y^2 + B3y^3 + B4Y^4 + B5Y^5 + B6Y^{6+\cdots}$$

The coefficients of the incident side surface (special surface) of the scanning lens 6 are given in Table 5.

TABLE 5

| | Coefficient in main scanning direction | | Coefficient in sub-scanning direction |
|---|---|---|---|
| Km | −5.35584 × 10 | $B_1$ | 0 |
| $A_4$ | −1.38469 × 10$^{-6}$ | $B_2$ | 0 |
| $A_6$ | −1.57916 × 10$^{-9}$ | $B_3$ | 0 |
| $A_8$ | 3.65531 × 10$^{-12}$ | $B_4$ | 0 |
| $A_{10}$ | −8.360685 × 10$^{-15}$ | $B_5$ | 0 |
| $A_{12}$ | 1.12844 × 10$^{-17}$ | $B_6$ | 0 |
| $A_{14}$ | −5.98173 × 10$^{-21}$ | $B_7$ | 0 |
| — |  | $B_8$ | 0 |

The coefficients of the projection side surface (special surface) of the scanning lens 6 are given in Table 6.

TABLE 6

| | Coefficient in main scanning direction | | Coefficient in sub-scanning direction |
|---|---|---|---|
| Km | 1.94524 | $B_1$ | −2.08484 × 10$^{-5}$ |
| $A_4$ | −9.04035 × 10$^{-7}$ | $B_2$ | 1.67626 × 10$^{-5}$ |
| $A_6$ | −1.03608 × 10$^{-9}$ | $B_3$ | −1.08187 × 10$^{-8}$ |
| $A_8$ | 1.32700 × 10$^{-12}$ | $B_4$ | −1.01661 × 10$^{-8}$ |
| $A_{10}$ | −3.07707 × 10$^{-15}$ | $B_5$ | 4.95931 × 10$^{-12}$ |
| $A_{12}$ | 3.39516 × 10$^{-18}$ | $B_6$ | 9.76946 × 10$^{-14}$ |
| $A_{14}$ | −1.38719 × 10$^{-21}$ | — |  |

The optical element of the first optical system before the deflector and the second optical element after the deflector are arranged appropriately so as the image forming positions of all the optical systems in the main scanning direction and the sub-scanning direction become near the surface to be scanned.

In the embodiment, when the coupling lens 2 does not have the diffraction surface, the fluctuation of a beam waist position in the main scanning direction becomes as shown in Table 7, when the temperature changes 20 degrees.

TABLE 7

|  | Temperature fluctuation |
| --- | --- |
| Light Source 1 (785 nm) | 10.020 mm |
| Light Source 2 (655 nm) | 10.086 mm |

On the other hand, in this embodiment when the coupling lens 2 has the diffraction surface, the fluctuation of the beam waist position in the main scanning direction becomes as shown in Table 8, when the temperature changes 20 degrees.

TABLE 8

|  | Temperature fluctuation |
| --- | --- |
| Light Source 1 (785 nm) | −0.159 mm |
| Light Source 2 (655 nm) | 0.741 mm |

By using the diffraction surface to the coupling lens 2 as described above, an optical scanning device that is robust against the fluctuation of the beam waist position in the main scanning direction caused by the temperature fluctuation can be realized for both the light sources 1 and 2 with different light-emitting wavelengths.

In the embodiment, the one that has a function to weaken the divergence of the divergent beams from the light sources was used as the coupling lens 2. However, it is not limited to this, and the one that has a function to collimate the beams from the light source, and the one that has a function to convert the beams from the light source to the weak convergent beams, the weak divergent beams, or the like maybe used for the coupling lens.

The diffraction surface may be used for the line image forming optical system and the scanning lens, in addition to the coupling lens. For the first optical system and the second optical system, not only the one described above, but also any suitable known one may be used. Also, for the image forming apparatus, not only the one described above, but also the any suitable known configuration may be used.

Another embodiment of the optical element will now be explained.

Figure 11:
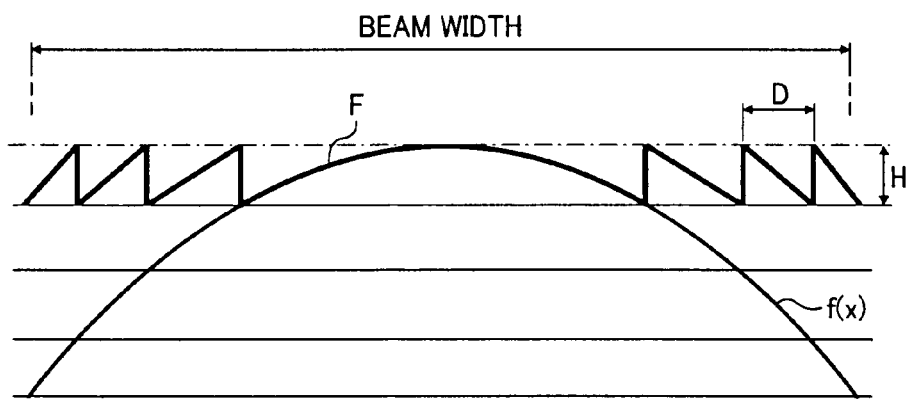
FIGS. 11 and 12 are schematic diagrams for explaining the diffraction surface of a diffractive-optical element.
Figure 12:
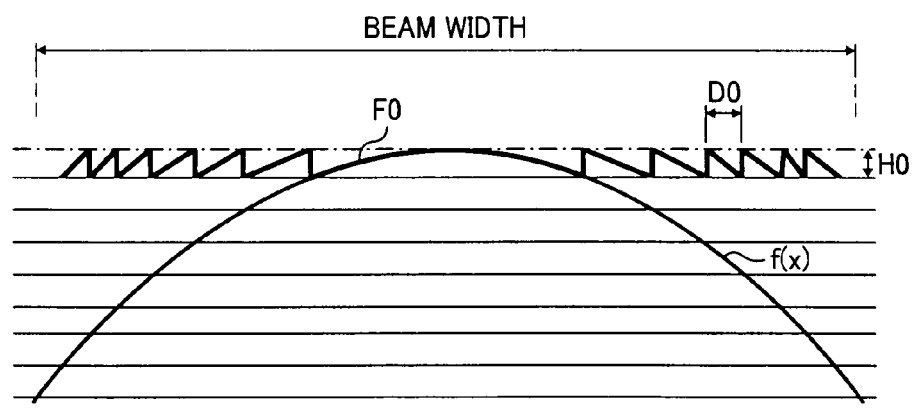

In FIGS. 11 and 12, reference numerals F and F0 indicate a diffraction surface with steps. A sectional shape of these diffraction surfaces is formed by folding an original shape determined by a continuous function f(x) at a predetermined step. The predetermined step is H in FIG. 11, and H0 in FIG. 12. For the diffractive-optical element, it is assumed to use the one that the diffraction surfaces F and F0 are formed at one surface of a transparent parallel plate.

The diffraction surface with steps includes the stair-like sectional shape as one of the embodiment. In this case, a portion that corresponds to a platform of the stair-like shape is a planar shape perpendicular to the optical axis.

The step is a height when the original shape f(x) is being bent. When the wavelength of the beams entering the diffraction surface as such is set as $\lambda$, and the refractive index of a medium to which the diffraction surface is formed is set as n, the H and the H0 is an integral multiple of $\lambda/\{n/(\lambda)-1\}$.

In the example shown in FIG. 12, the step H0 is set equal to $\lambda/\{n(\lambda)-1\}$. At this time, when the collimated beams enter the diffractive-optical element formed with the diffraction surface F0, a first diffractive light by the diffraction surface F0 is projected in 100% transmittance and forms an image at a certain focal length, theoretically.

However, as shown in FIG. 12, an interval D0 of the adjacent steps at the sectional shape of the diffraction surface F0 narrows rapidly towards the periphery (edge sides in both directions in FIG. 12). The larger beam coverage area of the diffractive-optical element (shown as a beam width in FIGS. 11 and 12), the narrower the interval D0 at the periphery of the diffraction surface becomes. Accordingly, a processing of the shape of the diffraction surface F0 becomes difficult to perform with high accuracy.

As for the shape of the diffraction surface shown in FIG. 11, a step H forming a diffraction surface F is set equal to a double of $\lambda/\{n(\lambda)-1\}$ with respect to the refractive index n($\lambda$) for the wavelength $\lambda$ of the incident beams and the wavelength $\lambda$ for a material of the diffractive-optical element. In a passing area of the incident beams (shown as the "beam width"), a number of steps is equal to or more than 6.

Accordingly, in the diffraction surface F, H is a double of $\lambda/\{n(\lambda)-1\}$. Therefore, a second diffractive light by the diffraction surface F is projected in 100% transmittance, and forms an image at a certain focal length, theoretically. In general, when the step of the diffraction surface formed to the diffractive-optical element is N ($\geqq 2$) of $\lambda/\{n(\lambda)-1\}$, an N order diffractive light is projected at 100% transmittance and forms an image at a certain focal length, theoretically.

By comparing FIGS. 11 and 12, it is evident that by setting the step H to a double of $\lambda/\{n(\lambda)-1\}$ (generally, N ($\geqq 2$), the interval D between the adjacent steps becomes large. This allows a large interval D at the periphery of the diffractive-optical element, thereby enabling to form the diffraction surface easier. From an aspect of the optical characteristics, only the diffractive order changes from the first diffractive light to the second diffractive light (generally, N order diffractive light). Therefore, the diffractive light of unnecessary diffractive order does not occur, theoretically.

Practically, when the step H is made larger than a value calculated by $\lambda/\{n(\lambda)-1\}$, the diffractive light of a desired order is not projected at 100% transmittance and the diffractive light of unnecessary diffractive order occurs. The occurrence of the diffractive light of unnecessary diffractive order depends largely on what sort of beams are entering the diffractive-optical element. As shown in the present embodiment, the diffractive-optical element is used for the beams with a long coherence length. When such beams with a long coherence length are entered, the occurrence of the diffractive light of unnecessary diffractive order is at an ignorable level.

The diffractive-optical element as described above is a diffractive-optical element with the optical transmittance used between the light source and the optical deflector of the optical scanning device. The optical scanning device deflects the beams with a long coherence length from the light source, focuses the beams on the surface to be scanned as the optical spot, and optically scans the surface to be scanned. When the diffractive-optical element is used for the optical scanning device, the light source is required to emit beams with a long coherence length. Because the beams emitted from the semiconductor laser have the coherence length of few ten millimeters to few meters, it is suitable for such a light source. However, it is not limited to this, and a gas laser and the like may be used for the light source.

The reason to use the one that emits the beams with a long coherence length for the light source is to prevent the occurrence of the diffractive light of unnecessary diffractive order at the diffraction surface of the diffractive-optical element.

As such, in this diffractive-optical element, the step H, which bends the original shape setting the shape of the diffraction surface, is set equal to a multiple of N (integer of 2) of $\lambda/\{n(\lambda)-1\}$. Therefore, the interval of the step within the coverage area can be secured widely even in the periphery, thereby enabling to form the shape of the diffraction surface easier. From an aspect of securing a size of the interval of the steps, the step is preferably deep. Accordingly, N is preferably large. However, when N is made large, the number of steps existing in the beams passing the diffractive-optical element decrease. Thus, an effect as the diffraction surface decreases and the diffractive efficiency lowers. This results in an unfavorable phenomenon of a decrease in a desired amount of diffractive light and an occurrence of unnecessary diffractive light of diffractive order.

In general, when a small optical element such as the coupling lens and the cylindrical lens are resinified, the transmittance becomes approximately 90% on its own (because an antireflection is not coated as glass). To expose the photosensitive body, it is preferable to have transmittance of equal to or more than 80% per one optical element that exists between the light source and the photosensitive body. The photosensitive body is practically the surface to be scanned that is optically scanned by the optical scanning device. As for the diffractive-optical element, the minimum value required as the diffractive efficiency with respect to the diffractive light of a desired order in the diffractive-optical element, is approximately $$0.8/0.9 = 89\%.$$

Figure 13:
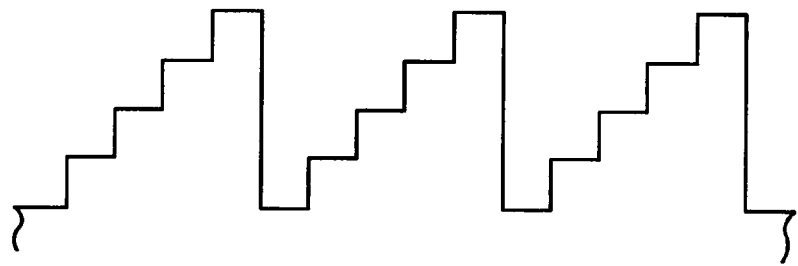
FIG. 13 is a schematic diagram for explaining a condition to realize a desired diffraction efficiency of the diffractive-optical element.

At this point, when a shape of a binary type diffraction surface shown in FIG. 13 is considered, the diffractive efficiency is expressed as $$\{\sin(\pi/N)/(\pi/N)\}^2.$$

When N=6, the diffractive efficiency exceeds 89%. Therefore, when the diffractive efficiency of equal to or more than 89% is to be realized in the shape of the binary type diffraction surface, the steps equal to or more than 6 are required as the step of the sectional shape of the diffraction surface. Such a theory may be applied to the shape of the diffraction surface that the original shape f(x) is bent at the predetermined step H as shown in FIGS. 11 and 12. When the steps equal to or more than 6 do not exit within an area of the beams passing through the diffractive-optical element (described as the "beam width" in FIGS. 11 and 12), the beams are not projected with the transmittance of equal to or more than 89%.

Therefore, in the area that the beams pass through the diffractive-optical element, the upper limit of multiple number N is limited, so as the number of steps forming the diffraction surface becomes equal to or more than 6.

When the step H that bends the original shape f(x) is set to a multiple of N ($\geqq$ integer of 2) of $\lambda/\{n(\lambda)-1\}$, for example, based on the two wavelengths λ1 and λ2, the step H can be a multiple of N1 ($\geqq$ integer of 2) of $\lambda 1/\{n(\lambda 1)-1$ with respect to the light of the wavelength λ1. The step H can be a multiple of N2 ($\geqq$ integer of 2) (N1≠N2) of $\lambda 2/\{n(\lambda 2)-1\}$ with respect to the light of the wavelength λ2.

The diffractive-optical element having the diffraction surface setting the step H as such generates the diffractive light of N1 order with respect to the light of the wavelength λ1. The element also generates the diffractive light of N2 order with respect to the light of the wavelength λ2. In other words, the same diffractive-optical element may be used as the optical element generating the diffractive light of order that is different with respect to the light having the different wavelengths λ1 and λ2.

For example, when the diffractive-optical element adopting the shape of diffraction surface designed to extract the fifth diffractive light (N=5) as an optical surface is used for the coupling lens in the optical scanning device using the semiconductor laser having a light-emitting wavelength of 780 nanometers, the same diffractive-optical element can be used for the coupling lens in the optical scanning device using the semiconductor laser having a light-emitting wavelength of 650 nanometers. Accordingly, the diffractive-optical element can function as the diffractive-optical element that can extract sixth diffractive light (N=6), and each diffractive efficiency becomes approximately 100%.

In general, when the diffractive-optical element optimally designed for a wavelength of 780 nanometers is used as the diffractive-optical element with different wavelength, the diffractive efficiency deteriorates significantly. Although such usage is not possible, when certain conditions are satisfied as described above, the optical element corresponding to a plurality of wavelengths can be designed. In other words, a step $\lambda_1/\{n(\lambda_1)-1\}$ at a plurality of wavelengths of $\lambda_1$ (i=1, 2, ...) considered to be used may be obtained, and the step H as its least common multiple may be determined.

The mainstream of the wavelength of the semiconductor laser used for the optical scanning device is 780 nanometers and 650 nanometers. Therefore, when the shape of diffraction surface is set as above, the diffractive-optical element that can be applied to those two can be realized without changing any shape. As a result, a considerable reduction in costs can be expected.

The diffractive-optical element explained above is a type forming the diffraction surface with steps to one surface of the transparent parallel plate. However, the diffractive-optical element is not limited to this, and may be the one that includes the diffraction surface disclosed in the present embodiment.

Figure 14:
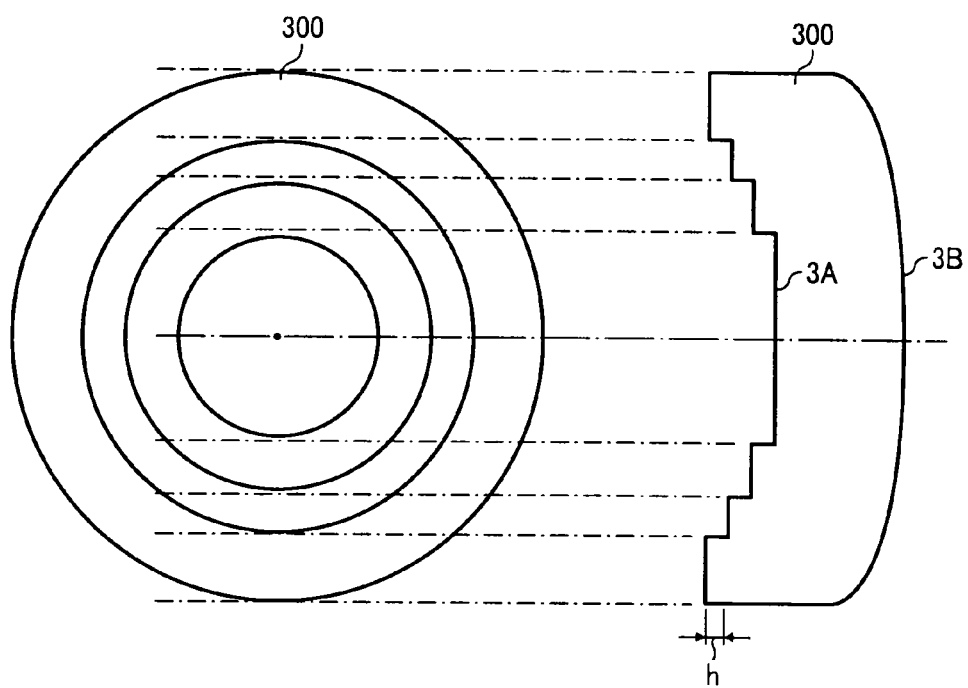
FIG. 14 is a schematic diagram for explaining a diffractive-optical element according to still another embodiment of the present invention.

FIG. 14 is a schematic diagram for explaining an embodiment of the diffractive-optical element.

In a diffractive-optical element 300 shown in FIG. 14, a diffraction surface 3A with steps is formed in the stair-like sectional shape. The step h is set equal to an integral multiple equal to or more than 2 of $$\lambda/\{n(\lambda)-1\}$$

with respect to the refractive index n(λ) to the wavelength λ of the incident beams and the wavelength λ of the diffractive-optical element material. A number of all the steps in the passing area of the incident beams equals to or more than 6 (6 in the example shown in FIG. 14). The power at the diffraction surface is substantially 0.

The number of all the steps in the passing area of the incident beam includes the optical axis, and it is the number of all the steps existing in the area where the incident beams pass through. For example, when the stair-like sectional shape of the diffraction surface is symmetrical with respect to the optical axis as a symmetrical axis, the number of all the steps is 2n, and equal to or more than six, when n steps exist to one side of the axis.

The diffraction surface having the stair-like sectional shape inevitably becomes a surface with convex or concave. Because the height of the step is smaller than a wavelength order, the surface functions as a refraction surface of convex or concave.

The power at the diffraction surface is substantially zero means that the power at the refraction surface and the lens power of the diffraction surface itself are canceled out each other. The refraction surface is formed by the stair-like sectional shape of the diffraction surface as such. Inevitably, the sectional shape of the diffraction surface becomes the stair-like shape.

The reason the number of the step or all the number of steps are set equal to or more than six is to realize an effective diffractive effect with respect to the beams passing through the diffraction surface.

In addition, as described above, by setting the step H of the diffraction surface equal to the integral multiple equal to or more than 2 of $\lambda/\{n(\lambda)-1\}$, the interval of the adjacent steps becomes large. As a result, the processing of the diffraction surface becomes easy, thereby enabling to manufacture the diffractive-optical element easier. Conventionally, the diffraction surface having a stair-like sectional structure is easy to form. Therefore, the diffractive-optical element having such diffraction surface is also easy to manufacture.

The number of steps of the diffractive-optical element equals to or more than six in a range that the incident beams pass through. Because it is used for the beams with a long coherence length, a good diffractive function can be realized.

To form the sectional shape of the diffraction surface 3A with steps in the stair-like shape, the power at the diffraction portion of the diffraction surface 3A and the power at a curved surface when the stair-like sectional shape is leveled smoothly are only required to be made equal magnitude but opposite signs. The diffraction surface obtained at this time inevitably becomes the stair-like shape as described above. In such structure, a relationship between the diffraction surface and a back cut becomes right angle at any point. As a result, it is easy to measure, and the processing becomes very easy.

Because the obtained diffraction surface 3A is non-powered, an influence of an eccentricity is extremely small, even if a reverse side surface 3B is eccentric, thereby enabling to suppress demands for processing accuracy. The stair-like diffraction surface may also adopt a forming method not to generate cutting marks such as a shaper. This can reduce a processing time. The reduction in the processing time also provides a side benefit such as reduction of heat generation during the processing. As a result, it is preferable to obtain the diffraction surface of high accuracy.

The power as the lens for the diffractive-optical element 300 is given as a composition of the power at the incident surface and the projection surface. Even if one surface 3A is non-powered, a desired lens power can be obtained, by appropriately setting the power for the reverse side surface 3B. Therefore, the diffraction surface having such stair-like sectional shape may be used for the lens with any power.

A surface accuracy of the diffraction surface 3A can be finished very smoothly, because there is no part with non-planar surface. Scattered light and a thickening of beam spot diameter seldom occur.

When the diffraction surface 3A having the stair-like sectional shape is used for the optical scanning device using the multi-beam light source, there is a merit that the fluctuation to the pitch of the scanning line on the surface to be scanned hardly occurs. The fluctuation is caused by the rotation in the axis direction by the diffractive-optical element.

The diffractive-optical element 300 in FIG. 14 is a rotational-symmetrical to the optical axis. The steps of the diffraction surface are in the concentric circles. By making the shape into the concentric ellipses, an anamorphic lens can be realized.

A number of steps forming the diffraction surface in the actual diffractive optic element are from few tens to few hundreds.

Figure 15:
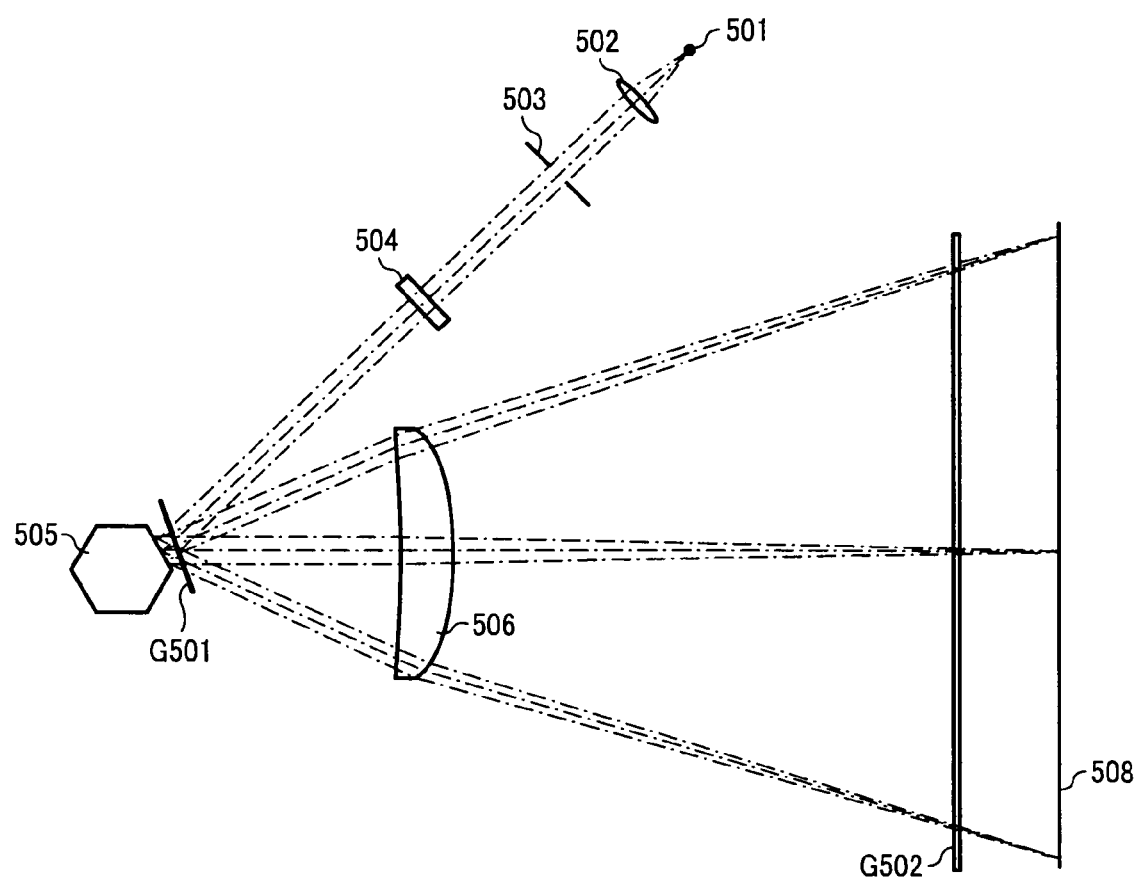
FIG. 15 is a schematic diagram for explaining an optical scanning device according to still another embodiment of the present invention.

FIG. 15 is a schematic diagram showing an optical arrangement of an embodiment of the optical scanning device.

The divergent beams emitted from a semiconductor laser 501 are converted into the beams of a desired configuration by a coupling lens 502. The beams are shaped by an aperture 503 and emit to an anamorphic optical element 504. The beams transmitted through the anamorphic optical element 504 are then transmitted through a sound-proof glass G501 while focusing in the sub-scanning direction. The beams form an image as a line image elongated in the main scanning direction near a deflection reflective surface of a polygon mirror 505 that is the optical deflector. When the beams are reflected to the deflection reflective surface, the beams are transmitted through the sound proof glass G501 and are incident on a scanning lens 506.

The scanning lens 506 is formed by one lens. The beams transmitted through the scanning lens 506 are emitted to a surface 508 to be scanned via a dust-proof glass G502. By an action of the scanning lens 506, the optical spot is formed on the surface 508 to be scanned.

When the polygon mirror 505 rotates at a constant velocity, the beams reflected by the deflection reflective surface deflect at a constant angular velocity. The scanning lens 506 has $f\theta$ characteristics. The optical spot formed by the beams entering while deflecting at a constant angular velocity moves towards the main scanning direction (top and bottom directions in FIG. 15) on the surface to be scanned at a constant speed. The optical spot optically scans the surface 8 to be scanned at a constant speed.

The scanning lens 506 is the anamorphic lens. In the sub-scanning direction, a position of the deflection reflective surface of the polygon mirror 505 and a position of the surface to be scanned are in a conjugate relationship in geometrical optics. This enables to correct a tangle error of the polygon mirror. The surface 508 to be scanned is practically a photo-sensitive surface of the photosensitive body.

The fluctuation at the beam waist position of the beams focused toward the surface to be scanned with respect to environmental fluctuation and wavelength fluctuation, when a resin lens is included in the optical system of the optical scanning device will be described. For a specific explanation, the coupling lens 502 is a glass lens, and the anamorphic optical element 504 and the scanning lens are the resin lens. These lenses are explained as the resin lenses. However, it is not limited to this, and the diffractive-optical element may be formed by a material such as glass and quartz.

A cause for the fluctuation of the beam waist position due to the temperature fluctuation is a fluctuation of the refractive index of the resin lens itself with the temperature fluctuation, and a fluctuation of the shape of the resin lens, and a fluctuation of the refractive index (color aberration) of the resin lens due to the wavelength fluctuation of the semiconductor laser may be considered.

The refractive index of the resin lens itself is reduced by a low-density expansion due to temperature rise.

As for the shape of the resin lens, the curvature of the lens surface is reduced with expansion due to temperature rise.

The light-emitting wavelength of the semiconductor laser generally shifts to a long-wavelength side with temperature rise. When the wavelength shifts to the long-wavelength side, the refractive index of the resin lens generally shifts to a side that decreases.

In other words, whether the lens is positive or negative, the resin lens changes so as the absolute value of the power decreases with temperature rise.

As for the power of the diffraction portion of the diffraction surface, a diffractive angle is proportional to the wavelength. Therefore, the power of the diffraction portion at the diffraction surface, whether it is positive or negative, has a tendency that the absolute value of the power increases as the wavelength increases.

Therefore, for example, when the composition power at the resin lens in the optical system of the optical scanning device is positive (or negative), the fluctuation in the power caused by the temperature fluctuation at the resin lens and the fluctuation in the power caused by the temperature fluctuation of the "diffraction portion" at the diffraction surface are canceled out each other. This is enabled by making the power of the diffraction portion at the diffraction surface to positive (or negative). The diffraction surface, for example, may be formed on a lens surface of the coupling lens 502. Or, the diffraction surface may be formed on a lens surface of the anamorphic optical element 504.

The diffraction surface may not necessarily be made on a flat surface, and the ones formed on a sphere or a cylindrical surface may be included. The sphere shape and the cylindrical shape of the substrate that forms the diffraction surface also have the power itself. The power generated only by the diffractive action of the diffraction surface excluding the power by the sphere shape and the like of the substrate itself is called the power of the diffraction portion.

For a specific explanation, a rise of the environmental temperature when the power at the resin lens included in the optical system and the power at the diffraction portion of the diffraction surface are both positive will be considered. At this time, it is set as A>0, B>0, C>0, and D<0 (fluctuation in a direction separating from the optical deflector is set positive) when an amount of fluctuation of the beam waist position caused by a fluctuation in the refractive index of the resin lens: A, an amount of fluctuation of the beam waist position caused by a fluctuation in the shape of the resin lens: B, an amount of fluctuation of the beam waist position caused by a fluctuation in the resin lens due to a fluctuation in the light-emitting wavelength of the semiconductor laser: C, and an amount of fluctuation of the beam waist position caused by a fluctuation in the power of the diffraction portion at the diffraction surface due to a fluctuation in the light-emitting wavelength of the semiconductor laser: D. A total amount of the fluctuation of the beam waist position caused by the temperature fluctuation is A+B+C−D.

A through C may be fixed when the optical system including the resin lens is fixed. Therefore, the amount of fluctuation of the beam waist position caused by the temperature fluctuation can be well corrected, by setting the power of the diffraction portion at the diffraction surface in the diffractive-optical element. This is enabled by satisfying A+B+C−D=0, which is the condition that the amount of fluctuation of the beam waist position becomes 0.

Figure 16:
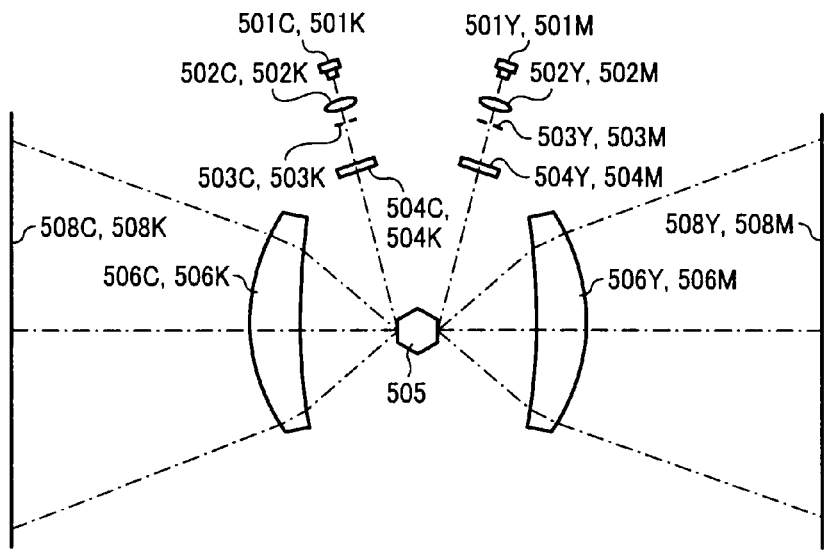
FIGS. 16 and 17 are schematic diagrams for explaining an image forming apparatus according to still another embodiment of the present invention.
Figure 17:
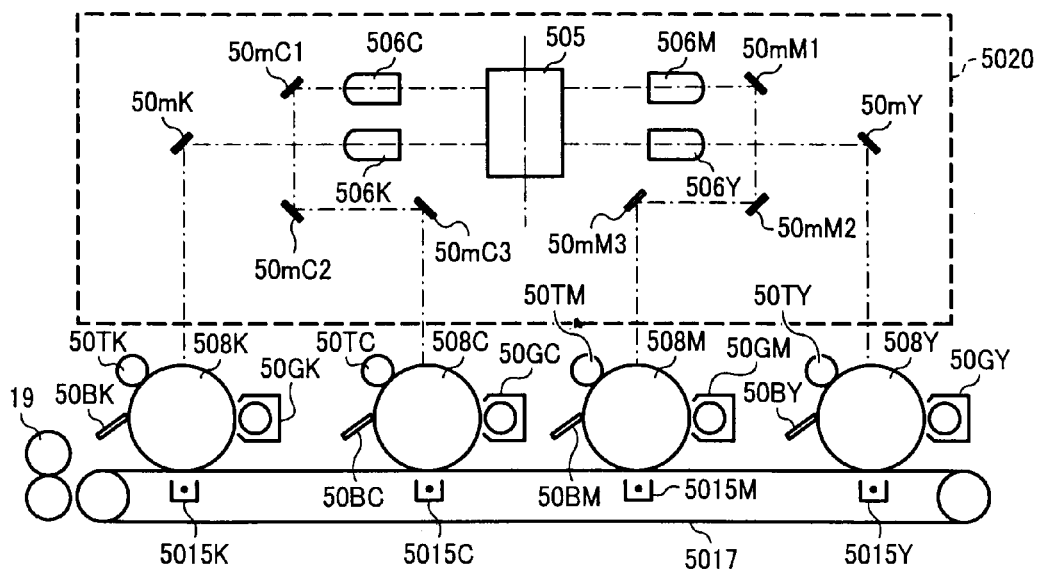

FIGS. 16 and 17 are schematic diagrams of an embodiment of the image forming apparatus of the optical scanning device having the diffractive-optical element as described above.

This image forming apparatus is a tandem type full color optical printer.

FIG. 16 is a schematic diagram showing a state of the optical portion in the optical scanning device of the image forming apparatus seen from the sub-scanning direction. In other words, it is seen from a rotational axis direction of the polygon mirror 505 that is the optical deflector. To simplify the drawing, the optical path is drawn in a straight line. The mirrors for bending the optical path on the optical path from the polygon mirror 505 to the surface to be scanned, which is the optical scanning position, are omitted.

The optical scanning device scans four surfaces to be scanned by a luminous flux, respectively.

As shown in FIG. 17, the four surfaces to be scanned are practically photoconductive drum-shape photosensitive bodies 508Y, 508M, 508C, and 508K. The electrostatic latent images formed on these four photosensitive bodies are individually visualized by magenta, yellow, cyan, and black toners, thereby forming a color image. Yellow, magenta, cyan, and black are distinguished by reference numerals Y, M, C, and K.

In FIG. 16, reference numerals 501Y, 501M, 501C, and 501K indicate semiconductor laser that is the light source. The semiconductor lasers 501Y and 501M are arranged so as to overlap in the sub-scanning direction, which is a direction perpendicular to the drawing. The semiconductor laser 501M is intensity-modulated by an image signal corresponding to a magenta image. The semiconductor laser 501Y is intensity-modulated by an image signal corresponding to a yellow image. Similarly, the semiconductor lasers 501C and 501K are arranged so as to overlap in the sub-scanning direction. The semiconductor laser 501C is intensity-modulated by an image signal corresponding to a cyan image. The semiconductor laser 501K is intensity-modulated by an image signal corresponding to a black image.

The luminous flux emitted from respective semiconductor lasers 501Y and 501M is collimated by coupling lenses 502Y and 502M (arranged so as to overlap in the sub-scanning direction and enter the luminous flux from each semiconductor laser). Then, the luminous flux passes through apertures 503Y and 503M (arranged so as to overlap in the sub-scanning direction) to be shaped. The luminous flux is focused into the sub-scanning direction, respectively, by cylindrical lenses 504Y and 504M that are arranged in the sub-scanning direction (arranged so as to overlap in the sub-scanning direction), and enters the polygon mirror 505. A line image elongated in the main scanning direction made by the cylindrical lenses 504Y and 504M forms an image near the deflection reflective surface of the polygon mirror 505.

The optical beams deflected by the polygon mirror 505 are transmitted through respective scanning lenses 506Y and 506M. By an action of these lenses, a optical spot is formed on the photosensitive bodies 508Y and 508M, which is practically the surface to be scanned, and optically scans these.

Similarly, the luminous flux emitted from the semiconductor lasers 501C and 501K is collimated by coupling lenses 502C and 502K. Then, the luminous flux passes through apertures 503C and 503K to be shaped. The luminous flux is focused in the sub-scanning direction, respectively, by cylindrical lenses 504C and 504K, and enters the polygon mirror 505 to be deflected. The luminous flux transmits through scanning lenses 506C and 506K, respectively. By an action of these lenses, a optical spot is formed on the photosensitive bodies 508C and 508K, which are practically the surface to be scanned, and optical scanned.

In FIG. 17, a portion 5020 is the optical scanning device, and this portion is explained with reference to FIG. 16. As shown in FIG. 17, one of the luminous fluxes deflected at an upper side of the polygon mirror 505 is guided to the photosensitive body 508M, by the optical path bent by the optical path bending mirrors 50mM1, 50mM2, and 50mM3. Other optical beams are guided to the photosensitive body 508M by the optical path bent by optical path bending mirrors 50mC1, 50mC2, and 50mC3.

One of the luminous fluxes deflected at lower side of the polygon mirror 505 is guided to the photosensitive body 508Y by the optical path bent by an optical path bending mirror 50mY. The other optical beams are guided to the photosensitive body 508K by the optical path bent by an optical path bending mirror 50mK.

Therefore, by four luminous fluxes emitted from the four semiconductor lasers 501Y, 501M, 501C, and 501K, the four photosensitive bodies 508Y, 508M, 508C, and 508K are optically scanned. The respective photosensitive bodies 508Y through 508K rotate at a constant velocity in a clock-wise direction. The photosensitive bodies 508Y through 508K are uniformly charged by charging rollers 50TY, 50TM, 50TC, and 50TK that form a charging unit. Corresponding to the optical scan of the respective luminous fluxes, respective yellow, magenta, cyan, and black images are written thereto. Accordingly, a corresponding electrostatic latent image (negative latent image) is formed.

These electrostatic latent images are reversal-developed by developing units 50GY, 50GM, 50GC, and 50GK. Then, a yellow toner image, a magenta toner image, a cyan toner image, and a black toner image is respectively formed on the photosensitive bodies 508Y, 508M, 508C, and 508K.

Each color toner image is transferred on the transfer sheet, which is not shown.

The transfer sheet is conveyed by a conveyor belt 5017. The yellow toner image is transferred from the photosensitive body 508Y by a transferring unit 5015Y. Using transferring units 5015M, 5015C, and 5015K, the magenta toner image, the cyan toner image, and the black toner image are sequentially transferred from the photosensitive bodies 508M, 508C, and 508K.

Accordingly, on the transfer sheet, the yellow toner image though the black toner image is superposed. Thus, the color image is formed synthetically. The color image is fixed on the transfer sheet by a fixing unit 5019, thereby obtaining the color image.

By using the optical scanning device having the diffractive-optical element to the image forming apparatus, a constantly stable beam spot diameter can be obtained regardless of temperature fluctuation. A compact and low-cost image forming apparatus suitable for highly accurate printing can be realized.

A portion of the optical scanning device 5020 of the image forming apparatus in FIGS. 16 and 17 is commonly arranged with four optical scanning devices and the polygon mirror 5 shown in FIG. 15. However, it is not limited to this, and the four optical scanning devices as shown in FIG. 15 may be provided individually to each photosensitive body.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A diffractive-optical element that is transparent, comprising:
a diffraction surface that is formed by a plurality of steps, wherein
a height of one of the plurality of steps is set substantially equal to a common multiple of $\lambda_i/\{n(\lambda_i)-1\}$ for two or more wavelengths, where $\lambda_i (i=1, 2, \ldots)$ is a wavelength and $n(\lambda_i)$ is a refractive index of the diffractive-optical element with respect to the wavelength $\lambda_i$.

2. The diffractive-optical element according to claim 1, wherein the diffraction surface is formed in a surface shape set in a manner that a power derived from a diffraction function defined by a diffraction surface shape and a power derived from a refraction function defined by the diffraction surface shape are canceled out by each other.

3. The diffractive-optical element according to claim 2, wherein the diffraction surface is formed in a straight groove shape in parallel with at least one of a main scanning direction and a sub-scanning direction in an optical scanning of a scanning surface.

4. The diffractive-optical element according to claim 2, wherein the height of the one of the plurality of steps of the diffraction surface is set substantially equal to a least common multiple of $\lambda_i/\{n(\lambda_i)-1\}$, where $\lambda_i (i=1,2, \ldots )$ is the wavelength and $n(\lambda_i)$ is the refractive index of the diffractive-optical element with respect to the wavelength $\lambda_i$.

5. The diffractive-optical element according to claim 2, wherein a maximum pitch of the diffraction surface is smaller than a beam width of a light that is incident on the diffraction surface.

6. The diffractive-optical element according to claim 2, wherein the diffractive-optical element is a coupling lens that couples a light from a light source to a subsequent optical system.

7. The diffractive-optical element according to claim 2, wherein the diffraction surface has a function of compensating a fluctuation of an optical function of a predetermined optical system caused by a temperature fluctuation.

8. The diffractive-optical element according to claim 1, wherein the number of the plurality of steps is equal to or more than six at an area through which an incident beam passes.

9. The diffractive-optical element according to claim 8, wherein a cross section of the diffraction surface is formed by folding an original shape determined by a continuous function at a depth of the one of the plurality of steps.

10. The diffractive-optical element according to claim 8, wherein,
a cross section of the diffraction surface is in a stair-like shape, and a power of the diffraction surface is substantially zero.

11. The diffractive-optical element according to claim 8, wherein,
the diffraction surface is formed on a first surface of the diffractive-optical element, and
a second surface of the diffractive-optical element is either one of a flat surface and a curved surface.

12. The diffractive-optical element according to claim 8, wherein the diffractive-optical element is made of a resin material.

13. An optical scanning device, comprising:
a light source configured to emit a light beam;
an optical deflector configured to deflect the light beam from the light source;
a first optical system positioned to guide the light beam from the light source to the optical deflector;
a second optical system positioned to form the light beam deflected by the optical deflector as an optical spot on a scanning surface; and
an optical scanning unit configured to optically scan the scanning surface, wherein,
at least one of the first optical system and the second optical system includes a diffractive-optical element that is transparent,
the diffractive-optical element includes a diffraction surface that is formed by a plurality of steps,
a height of one of the plurality of steps is set substantially equal to a common multiple of $\lambda_i/\{n(\lambda_i)-1\}$ for two or more wavelengths, where $\lambda_i (i=1, 2, \ldots)$ is a wavelength and $n(\lambda_i)$ is a refractive index of the diffractive-optical element with respect to the wavelength $\lambda_i$, and
the diffraction surface is formed in a surface shape set in a manner that a power derived from a diffraction function defined by a diffraction surface shape and a power derived from a refraction function defined by the diffraction surface shape are canceled out by each other.

14. The optical scanning device according to claim 13, wherein,
a plurality of light sources is provided each emitting a light of the wavelength $\lambda_i (i=1, 2, \ldots )$, and the first optical system and the second optical system are positioned to guide the lights of the wavelength $\lambda_i$ from the plurality of light sources and have substantially the same optical characteristics.

15. The optical scanning device according to claim 13, wherein the diffractive-optical element is arranged between the light source and the optical deflector.

16. The optical scanning device according to claim 15, wherein, the light source is a semiconductor laser, including an optical element made of a resin material, and the diffraction surface of the diffractive-optical element is set in a manner that a fluctuation of a wavelength in the light source, a fluctuation of shapes of all optical elements, including the first optical system, the optical deflector, and the second optical system, from the light source to the scanning surface caused by a temperature fluctuation, and a fluctuation of a beam waist position in at least one of a main scanning direction and a sub-scanning direction caused by a fluctuation of a refractive index of the diffractive-optical element become substantially zero.

17. An image forming apparatus, comprising:

an image forming unit configured to form an image by an optical scanning; and an optical scanning device including, a light source configured to emit a light beam, an optical deflector configured to deflect the light beam from the light source, a first optical system positioned to guide the light beam from the light source to the optical deflector, a second optical system positioned to form the light beam deflected by the optical deflector as an optical spot on a scanning surface, and an optical scanning unit configured to optically scan the scanning surface, wherein, at least one of the first optical system and the second optical system includes a diffractive-optical element that is transparent, the diffractive-optical element includes a diffraction surface that is formed by a plurality of steps, a height of one of the plurality of steps is set substantially equal to a common multiple of $\lambda_i/\{n(\lambda_i)-1\}$ for two or more wavelengths, where $\lambda_i$ (i=1, 2, ...) is a wavelength and $n(\lambda_i)$ is a refractive index of the diffractive-optical element with respect to the wavelength $\lambda_i$, and the diffraction surface is formed in a surface shape set in a manner that a power derived from a diffraction function defined by diffraction surface shape and a power derived from a refraction function defined by the diffraction surface shape are canceled out by each other.

* * * * *